(12) United States Patent
Bar-Sade et al.

(10) Patent No.: US 12,707,406 B1
(45) Date of Patent: Aug. 11, 2026

(54) POWER-EFFICIENT COMMUNICATION SYNCHRONIZATION

(71) Applicant: Apple Inc., Cupertino, CA (US)

(72) Inventors: Idan Bar-Sade, Sunnyvale, CA (US); Ajay Panchal, San Diego, CA (US); Baohua Zheng, San Diego, CA (US); Prashant H Vashi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 18/455,155

(22) Filed: Aug. 24, 2023

Related U.S. Application Data

(60) Provisional application No. 63/401,523, filed on Aug. 26, 2022.

(51) Int. Cl.
*H04W 56/00* (2009.01)
*H04B 7/06* (2006.01)
*H04B 7/185* (2006.01)

(52) U.S. Cl.
CPC ........ *H04W 56/001* (2013.01); *H04B 7/0695* (2013.01); *H04B 7/18513* (2013.01)

(58) Field of Classification Search
CPC .............. H04W 56/001; H04B 7/0695; H04B 7/18513
See application file for complete search history.

(56) References Cited

U.S. PATENT DOCUMENTS 11,012,921 B2 * 5/2021 Agiwal ................. H04W 48/12
12,532,350 B2 * 1/2026 Ali ...................... H04W 74/006
2015/0133515 A1 * 5/2015 Chigaev ............... A61K 31/357 514/378
2019/0208515 A1 * 7/2019 Schliwa-Bertling ...... H04L 1/08
2020/0137666 A1 * 4/2020 Agiwal ............... H04W 68/005
2020/0367196 A1 * 11/2020 Chen ..................... H04L 5/0053

(Continued)

OTHER PUBLICATIONS

InterDigital, Introduction of Release-17 support for Non-Terrestrial Networks (NTN), 3GPP RAN WG2 Meeting #117-e, Feb. 21, 2022, R2-2203618, 3GPP.

(Continued)

*Primary Examiner* — Harry H Kim
(74) *Attorney, Agent, or Firm* — Treyz Law Group, P.C.; Michael H. Lyons

(57) ABSTRACT

A communications system may include user equipment (UE) devices, non-geostationary orbit satellites, and gateways. The satellites may provide communications services to the UE devices. A given satellite may have a set of signal beams. The satellite may transmit bursts of repeated system synchronization blocks (SSBs), repeated first system information blocks, and repeated second system information blocks over each of its beams with different respective SSB periods separated in time by SSB offsets. The SSB periods may be relatively long to minimize power consumption on the satellite. Repeating the blocks may ensure that UE devices receive the blocks even if intervening objects are present between the UE devices and the satellite. The UE devices may use the blocks to synchronize with the network for registering with the network and for performing subsequent communications operations such as mobile-terminated (MT) services, mobile-originated (MO) services, and handover.

20 Claims, 14 Drawing Sheets

(56) References Cited

U.S. PATENT DOCUMENTS

| | | | | |
|---|---|---|---|---|
| 2023/0116580 | A1* | 4/2023 | Cheng | H04W 56/0035 370/329 |
| 2024/0049016 | A1* | 2/2024 | Lei | H04W 16/14 |
| 2024/0171362 | A1* | 5/2024 | Jung | H04W 72/232 |
| 2024/0284193 | A1* | 8/2024 | Matsumura | H04W 56/001 |
| 2024/0284233 | A1* | 8/2024 | Maleki | H04L 5/0048 |
| 2024/0348313 | A1* | 10/2024 | Kim | H04B 7/088 |
| 2025/0023682 | A1* | 1/2025 | Im | H04L 5/0048 |
| 2025/0047368 | A1* | 2/2025 | Li | H04B 7/18541 |
| 2025/0081103 | A1* | 3/2025 | Zhou | H04W 76/27 |
| 2025/0184065 | A1* | 6/2025 | Li | H04W 52/0206 |
| 2026/0089763 | A1* | 3/2026 | Nishio | H04W 74/0833 |

OTHER PUBLICATIONS

ZTE Corporation, Sanechips, Introduction of NTN, 3GPP TSG-RAN WG2 Meeting #117-e, Feb. 21, 2022, R2-2204259, 3GPP.

Thales, Support of Non-Terrestrial Networks, 3GPP TSG-RAN WG2 Meeting #117-e, Feb. 21, 2022, R2-2204262, 3GPP.

* cited by examiner

POWER-EFFICIENT COMMUNICATION SYNCHRONIZATION

This application claims the benefit of U.S. Provisional Patent Application No. 63/401,523, filed Aug. 26, 2022, which is hereby incorporated by reference herein in its entirety.

FIELD

This relates generally to wireless communications, including wireless communications via one or more satellites.

BACKGROUND

Communications systems are used to convey data between user equipment devices. Some communications systems include satellites that wirelessly convey data between user equipment devices and gateways. Each satellite provides wireless network access to the user equipment devices located within a corresponding coverage area on Earth.

As satellites are located in space, resources on the satellites are limited. It can be challenging for the satellites to provide satisfactory communications services in a resource-efficient manner, particularly when the satellites are non-stationary with respect to Earth and when there are many user equipment devices communicating via the satellites.

SUMMARY

A communications system may include user equipment (UE) devices, a constellation of communications satellites, gateways, and a core network. The communications satellites may include non-geostationary orbit (NGSO) satellites. The satellites may provide wireless communications services to the UE devices.

A given satellite may have a set of signal beams overlapping different beam footprints on Earth. The satellite may transmit bursts of repeated system synchronization blocks (SSBs), repeated first system information blocks, and repeated second information blocks over each of its beams with different respective SSB periods. The SSB periods may be separated in time by SSB offsets. The SSB periods may be relatively long (e.g., 30-60 seconds) to minimize power consumption on the satellite. Repeating the blocks may ensure that UE devices receive the blocks even if intervening objects are present between the UE devices and the satellite. The UE devices may use the blocks to synchronize with the network for registering with the network and for performing subsequent communications operations such as mobile-terminated (MT) services, mobile-originated (MO) services, and handover.

For MT services, the satellite may transmit information identifying respective paging cycles for each of the beams in the system information blocks. Connected mode UE devices may wake their transceivers during wake-up periods according to the paging cycles for the corresponding beam. The satellite may transmit a paging signal to each of the UE devices in a beam overlapping a paged UE device. The satellite may append an SSB to the beginning of the paging signal to help keep synchronization of the UE devices in the beam current despite the relatively long SSB period. If desired, the satellite may forego transmission of the appended SSB when the paging signal is transmitted less than a threshold time from the last transmission of an SSB over the beam.

For MO services, a UE device may generate frequency and time offsets associated with propagation between the UE device and a satellite based on ephemeris data included in the system information blocks. The UE device may transmit a message requesting MO services using the generated offsets. The UE device may transmit the message with a relatively long preamble and the satellite may receive the message using an extended search space. The satellite may transmit a response to the message and may append an SSB to the beginning of the response. The UE device may use the SSB to successfully decode the message prior to completing the MO procedure, despite the relatively long SSB period.

For handover, a UE device being served by a first beam may receive information identifying a set of neighboring beams in the system information blocks. The neighboring beams may belong to the same satellite as the first beam and/or may include beams of other satellites. The UE device may predict best neighboring beams from the set of neighboring beams based on the ephemeris data and/or sensor data. The UE device may transmit an on-demand request to the satellite for transmission of SSBs over the best neighboring beams. The satellite may coordinate transmission of the SSBs over the best neighboring beams. The UE device may receive the SSBs over the best neighboring beams and may generate a measurement report from the received SSBs. The UE device may transmit the measurement report to the satellite. The UE device and the satellite may subsequently perform a handover from the first beam to a best-performing beam from the best neighboring beams (e.g., based on the measurement report). This procedure may reduce power consumption at the satellite by allowing the satellite to perform handover without frequent transmission of reference signals over all the neighboring beams.

DETAILED DESCRIPTION

Figure 1:
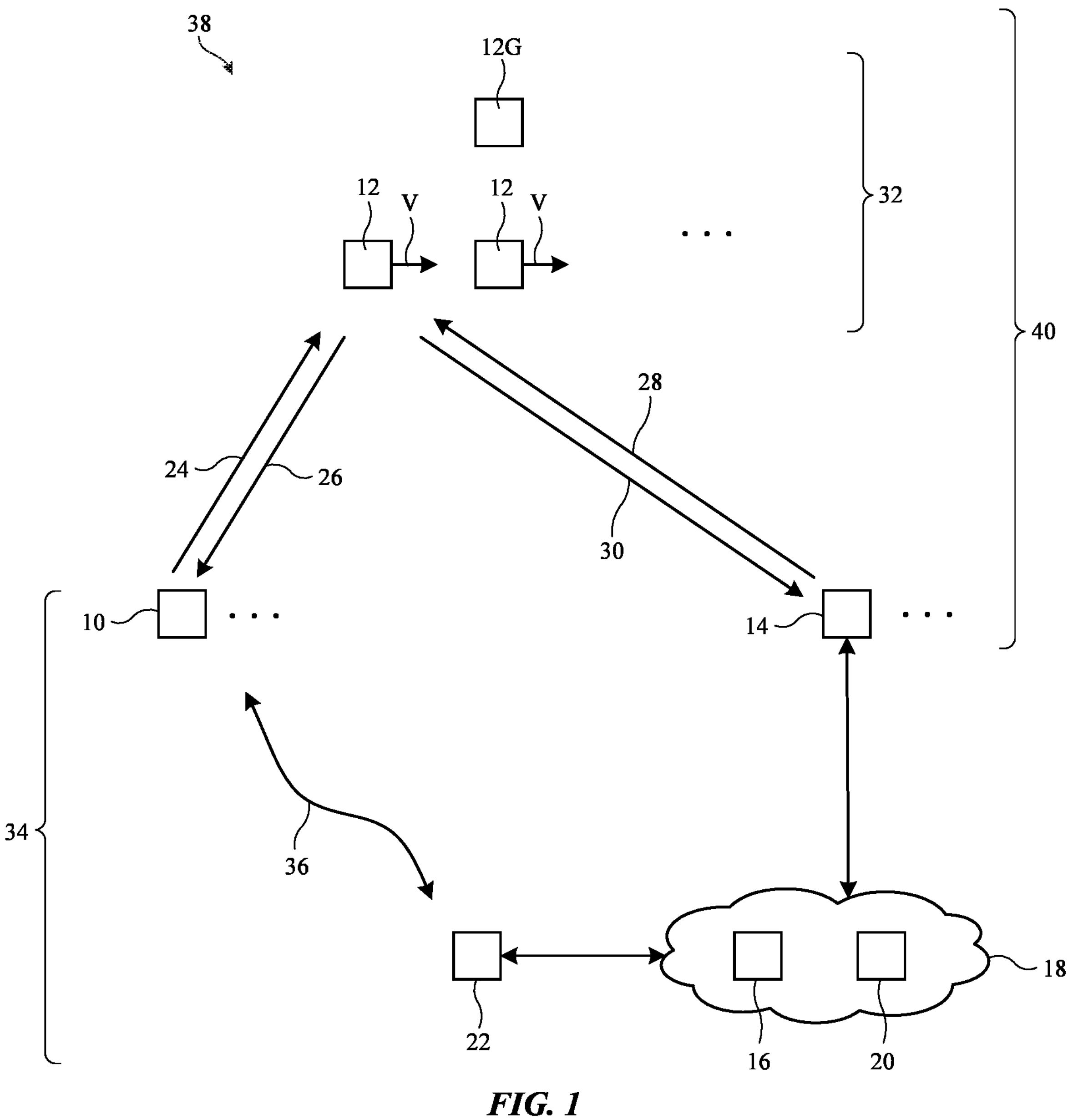
FIG. 1 is a diagram of an illustrative communications system having user equipment devices that communicate with gateways via a constellation of communications satellites in accordance with some embodiments.

FIG. 1 is a diagram of an illustrative communications system 38. Communications system 38 (sometimes referred to herein as communications network 38, network 38, system 38, satellite communications system 38, or satellite communications network 38) may include a ground-based (terrestrial) gateway system that includes one or more gateways 14 and one or more user equipment (UE) devices 10. Gateways 14 and UE devices 10 may form a part of a terrestrial network 34 on Earth. Terrestrial network 34 may include terrestrial-based wireless communications equipment 22 and network portion 18. Terrestrial-based wireless communications equipment 22 may include one or more wireless base stations (e.g., for implementing a cellular telephone network) and/or wireless access points (e.g., for implementing a wireless local area network).

Communications system 38 may also include a constellation 32 of one or more communications satellites 12 and 12G (sometimes referred to herein simply as satellites 12 and 12G). UE devices 10, gateways 14, and constellation 32 may form a part of non-terrestrial network (NTN) 40, which conveys signals between UE devices 10 and gateways 14 via constellation 32. Constellation 32 may sometimes be referred to herein as satellite constellation 32. Communications satellites 12 and 12G are located in space (e.g., in orbit above Earth). While communications system 38 may include any desired number of gateways 14, any desired number of communications satellites, and any desired number of UE devices 10, only a single gateway 14, three communications satellites, and a single UE device 10 are illustrated in FIG. 1 for the sake of clarity. Each gateway 14 in communications system 38 may be located at a different respective geographic location on Earth (e.g., across different regions, states, provinces, countries, continents, etc.).

Network portion 18 may be communicably coupled to terrestrial-based wireless communications equipment 22 and each of the gateways 14 in communications system 38. Gateway (GW) 14 may include a satellite network ground station and may therefore sometimes also be referred to as ground station (GS) 14 or satellite network ground station 14. Each gateway 14 may include one or more antennas (e.g., electronically and/or mechanically adjustable antennas), modems, transceivers, amplifiers, beam forming circuitry, control circuitry (e.g., one or more processors, storage circuitry, etc.) and other components that are used to convey communications data. The components of each gateway 14 may, for example, be disposed at a respective geographic location (e.g., within the same computer, server, data center, building, etc.). Gateways 14 may convey communications data between terrestrial network 34 and UE devices 10 via satellite constellation 32.

Network portion 18 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). Network portion 18 may include one or more relay networks, mesh networks, local area networks (LANs), wireless local area networks (WLANs), ring networks (e.g., optical rings), cloud networks, virtual/logical networks, the Internet, combinations of these, and/or any other desired network nodes coupled together using any desired network topologies (e.g., on Earth). The network nodes, terminals, and/or end hosts may include network switches, network routers, optical add-drop multiplexers, other multiplexers, repeaters, modems, servers, network cards, wireless access points, wireless base stations, UE devices such as UE devices 10, and/or any other desired network components. The network nodes in network portion 18 may include physical components such as electronic devices, servers, computers, user equipment, etc., and/or may include virtual components that are logically defined in software and that are distributed across (over) two or more underlying physical devices (e.g., in a cloud network configuration).

Network portion 18 may include one or more satellite network operations centers such as network operations center (NOC) 16. NOC 16 may control the operation of gateways 14 in communicating with satellite constellation 32. NOC 16 may also control the operation of the satellites in satellite constellation 32. For example, NOC 16 may convey control commands via gateways 14 that control positioning operations (e.g., orbit adjustments), sensing operations (e.g., thermal information gathered using one or more thermal sensors), and/or any other desired operations performed in space by satellites 12. NOC 16, gateways 14, and satellite constellation 32 may be operated or managed by a corresponding satellite constellation operator.

Communications system 38 may also include a satellite communications (satcom) network service provider (e.g., a satcom network carrier or operator) for controlling wireless communications between UE devices 10 and terrestrial network 34 via satellite constellation 32. The satcom network service provider may be a different entity than the satellite constellation operator that controls/operates NOC 16, gateways 14, and satellite constellation 32 or, if desired, may be the same entity as the satellite constellation operator. Terrestrial-based wireless communications equipment 22 in terrestrial network 34 may be operated by one or more terrestrial network carriers or service providers. The terrestrial network carriers or service providers may be different entities than the satcom network service provider or, if desired, may be the same entity as the satcom network service provider.

One or more gateways 14 may control the operations of satellite constellation 32 over corresponding radio-frequency communications links. Satellite constellation 32 may include any desired number of satellites (e.g., two satellites, four satellites, ten satellites, dozens of satellites, hundreds of satellites, thousands of satellites, etc.), three of which are shown in FIG. 1. If desired, two or more of the satellites in satellite constellation 32 may convey radio-frequency signals between each other using satellite-to-satellite (e.g., relay) links.

Constellation 32 may include a set of non-geostationary orbit (NGSO) satellites (e.g., satellites in non-geostationary orbits) and, if desired, may include a set of geostationary orbit (GSO) satellites (e.g., satellites in geostationary/geosynchronous orbits, sometimes referred to as geosynchronous satellites or GEO satellites). The satellites 12 of constellation 32 as described herein are NGSO satellites (e.g., satellites 12 may be in NGSO orbits and may sometimes be referred to herein as NGSO satellites 12). Satellites 12 therefore move relative to the surface of Earth over time (e.g., at velocities V relative to the surface of Earth). The satellites 12G of constellation 32 are GSO satellites (e.g., satellites 12G may be in GSO orbits and may sometimes be referred to herein as GSO satellites 12G). GSO satellites 12G do not move relative to the surface of Earth (e.g., GSO satellites 12G may orbit around Earth at a velocity that matches the rotation of Earth given the altitude of the satellites).

GSO satellites 12G may orbit Earth at orbital altitudes of greater than around 30,000 km. Satellites 12 may include low earth orbit (LEO) satellites at orbital altitudes of less than around 8,000 km (e.g., satellites in low earth orbits, inclined low earth orbits, low earth circular orbits, etc.), medium earth orbit (MEO) satellites at orbital altitudes between around 8,000 km and 30,000 km (e.g., satellite in medium earth orbits), sun synchronous satellites (e.g., satellites in sun synchronous orbits), satellites in tundra orbits, satellites in Molniya orbits, satellites in polar orbits, and/or satellites in any other desired non-geosynchronous orbits around Earth. If desired, satellites 12 may include multiple sets of satellites each in a different type of orbit and/or each at a different orbital altitude. In general, constellation 32 may include satellites in any desired combination of orbits or orbit types.

The satellites 12 and 12G in constellation 32 may communicate with one or more UE devices 10 on Earth using one or more radio-frequency communications links (e.g., satellite-to-user equipment links). Satellites 12 and 12G may also communicate with gateways 14 on Earth using radio-frequency communications links (e.g., satellite-to-gateway links). Radio-frequency signals may be conveyed between UE devices 10 and satellites 12/12G and between satellites 12/12G and gateways 14 in IEEE bands such as the IEEE C band (4-8 GHZ), S band (2-4 GHZ), L band (1-2 GHZ), X band (8-12 GHz), W band (75-110 GHz), V band (40-75 GHZ), K band (18-27 GHZ), $K_a$ band (26.5-40 GHz), $K_u$ band (12-18 GHz), and/or any other desired satellite communications bands. If desired, different bands may be used for the satellite-to-user equipment links than for the satellite-to-gateway links.

Communications may be performed between gateways 14 and UE devices 10 in a forward (FWD) link direction and/or in a reverse (REV or RWD) link direction. In the forward link direction (sometimes referred to simply as the forward link), wireless data is conveyed from gateways 14 to UE device(s) 10 via satellite constellation 32. For example, a gateway 14 may transmit forward link data to one of the satellites 12 in satellite constellation 32 (e.g., using radio-frequency signals 28). Satellite 12 may transmit (e.g., relay) the forward link data received from gateway 14 to UE device(s) 10 (e.g., using radio-frequency signals 26). Radio-frequency signals 28 are conveyed in an uplink direction from gateway 14 to satellite 12 and may therefore sometimes be referred to herein as uplink (UL) signals 28, forward link UL signals 28, or forward link signals 28. Radio-frequency signals 26 are conveyed in a downlink direction from satellite 12 to UE device(s) 10 and may therefore sometimes be referred to herein as downlink (DL) signals 26, forward link DL signals 26, or forward link signals 26.

In the reverse link direction (sometimes referred to simply as the reverse link), wireless data is conveyed from UE device(s) 10 to gateways 14 via satellite constellation 32. For example, one of the UE devices 10 may transmit reverse link data to one of the satellites 12 in constellation 32 using radio-frequency signals 24 and satellite 12 may transmit (e.g., relay) the reverse link data received from UE device 10 to a corresponding gateway 14 using radio-frequency signals 30. Radio-frequency signals 24 are conveyed in an uplink direction from UE device 10 to satellite 12 and may therefore sometimes be referred to herein as uplink (UL) signals 24, reverse link UL signals 24, or reverse link signals 24. Radio-frequency signals 30 are conveyed in a downlink direction from satellite 12 to gateway 14 and may therefore sometimes be referred to herein as downlink (DL) signals 30, reverse link DL signals 30, or reverse link signals 30. Gateway 14 may forward wireless data between UE device(s) 10 and network portion 18. Network portion 18 may forward the wireless data to any desired network nodes or terminals of terrestrial network 34. Satellites 12/12G may also generate and transmit other information in DL signals 30 (e.g., information other than wireless data relayed from gateway(s) 14). Such information may include reference signals and synchronization signals (e.g., system synchronization and information blocks), paging signals, physical random access channel (PRACH) messages or responses, physical downlink shared channel (PDSCH) messages, etc.

If desired, UE devices 10 may also convey radio-frequency signals with terrestrial-based wireless communications equipment 22 over terrestrial network wireless communication links 36 when available. UE devices 10 may sometimes be referred to herein as being "online" or "on-grid" when the UE devices are within range of terrestrial-based wireless communications equipment 22 and when terrestrial-based wireless communications equipment 22 provides access (e.g., communications resources) to network portion 18 for the UE devices. When the UE devices are online, the UE devices may communicate with other network nodes or terminals in network portion 18 via terrestrial network wireless communications links 36. Conversely, UE devices 10 may sometimes be referred to herein as being "offline" or "off-grid" when the UE devices are out of range of terrestrial-based wireless communications equipment 22 or when terrestrial-based wireless communications equipment 22 does not provide access to network portion 18 for the UE devices (e.g., when terrestrial-based wireless communications equipment 22 is disabled due to a power outage, natural disaster, traffic surge, or emergency, when terrestrial-based wireless communications equipment 22 denies access to network portion 18 for the UE devices, when terrestrial-based wireless communications equipment 22 is overloaded with traffic, etc.). If desired, UE devices 10 may include separate antennas for handling communications over the satellite-to-user equipment link and one or more terrestrial network wireless communication links 36 or UE devices 10 may include a single antenna that handles both the satellite-to-user equipment link and the terrestrial network wireless communications links. The terrestrial network wireless communications links may be, for example, cellular telephone links (e.g., links maintained using a cellular telephone communications protocol such as a 4G Long Term Evolution (LTE) protocol, a 3G protocol, a 3GPP Fifth Generation (5G) New Radio (NR) protocol, etc.), wireless local area network links (e.g., Wi-Fi® and/or Bluetooth links), etc.

The wireless data conveyed in DL signals 26 may sometimes be referred to herein as DL data, forward link DL data, or forward link data. UL signals 28 may also convey the forward link data (e.g., forward link data that is routed by satellite 12 to UE device(s) 10 in DL signals 26). The wireless data conveyed in UL signals 24 may sometimes be referred to herein as UL data, reverse link UL data, or reverse link data. The reverse link data may be generated by UE device(s) 10. DL signals 30 may also convey the reverse link data. The forward link data may be generated by any desired network nodes or terminals of terrestrial network 34. The forward link data and the reverse link data may include text data such as email messages, text messages, web browser data, an emergency or SOS message, a location message identifying the location of UE device(s) 10, or other text-based data, audio data such as voice data (e.g., for a bi-directional satellite voice call) or other audio data (e.g., streaming satellite radio data), video data (e.g., for a bi-directional satellite video call or to stream video data transmitted by gateway 14 at UE device(s) 10), cloud network synchronization data, data generated or used by software applications running on UE device(s) 10, data for use in a distributed processing network, and/or any other desired data. UE devices 10 may only receive forward link data, may only transmit reverse link data, or may both transmit reverse link data and receive forward link data. Each satellite 12/12G may communicate with the UE devices 10 located within its coverage area (e.g., UE devices 10 located within cells on Earth that overlap the signal beam(s) producible by the satellite).

The satcom network service provider for communications system 38 may operate, control, and/or manage a satcom control network such as core network (CN) 20 in network portion 18. CN 20 may sometimes also be referred to herein as satcom network region 20, CN region 20, satcom controller 20, satcom network 20, or satcom service provider equipment 20. CN 20 may be implemented on one or more network nodes and/or terminals of network portion 18 (e.g., one or more servers or other end hosts). In some implementations, CN 20 may be formed from a cloud computing network distributed over multiple underlying physical network nodes and/or terminals distributed across one or more geographic regions. CN 20 may therefore sometimes also be referred to herein as a CN cloud region or satcom network cloud region.

CN 20 may control and coordinate wireless communications between terminals of terrestrial network 34 and UE devices 10 via satellite constellation 32. For example, gateways 14 may receive reverse link data from UE devices 10 via satellite constellation 32 and may route the reverse link data to CN 20. CN 20 may perform any desired processing operations on the reverse link data. For example, CN 20 may identify destinations for the reverse link data and may forward the reverse link data to the identified destinations. CN 20 may also receive forward link data for transmission to UE devices 10 from one or more terminals (end hosts) of terrestrial network 34 (e.g., network portion 18). CN 20 may process the forward link data to schedule the forward link data for transmission to UE devices 10 via satellite constellation 32. CN 20 may schedule the forward link data for transmission to UE devices 10 by generating forward link traffic grants for each of the UE devices that are to receive forward link data. CN 20 may provide the forward link data and the forward link traffic grants to gateways 14. Gateways 14 may transmit the forward link data to UE devices 10 via satellite constellation 32 according to the forward link traffic grants (e.g., according to a forward link communications schedule that implements the forward link traffic grants). CN 20 may include, be coupled to, and/or be associated with one or more content delivery networks (CDNs) that provide content for delivery to UE devices 10.

UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

Figure 2:
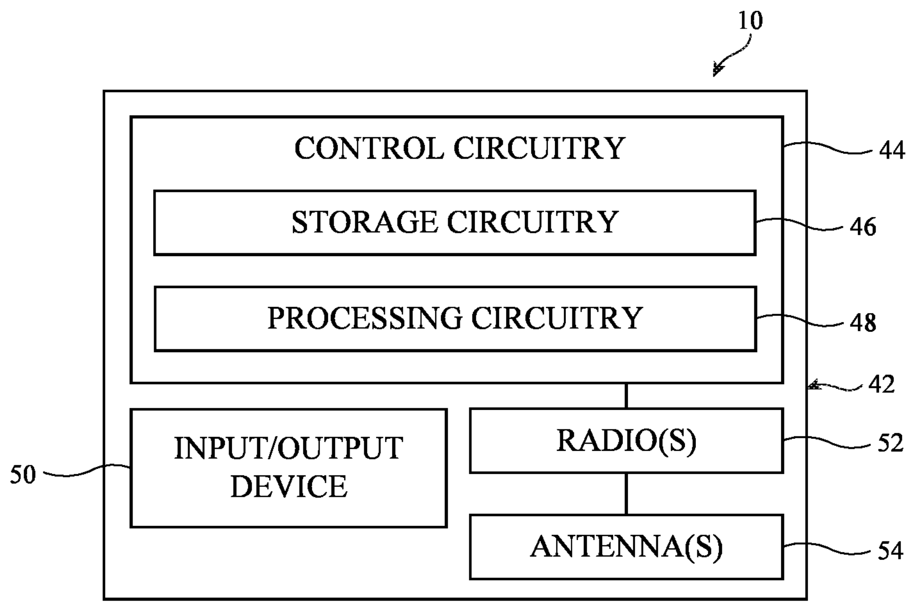
FIG. 2 is a schematic diagram of an illustrative user equipment device in accordance with some embodiments.

As shown in FIG. 2, UE device 10 may include components located on or within an electronic device housing such as housing 42. Housing 42, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 42 may be formed from dielectric or other low-conductivity material (e.g., glass, ceramic, plastic, sapphire, etc.). In other situations, housing 42 or at least some of the structures that make up housing 42 may be formed from metal elements.

UE device 10 may include control circuitry 44. Control circuitry 44 may include storage such as storage circuitry 46. Storage circuitry 46 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 46 may include storage that is integrated within UE device 10 and/or removable storage media.

Control circuitry 44 may include processing circuitry such as processing circuitry 48. Processing circuitry 48 may be used to control the operation of UE device 10. Processing circuitry 48 may include on one or more processors (e.g., microprocessors, microcontrollers, digital signal processors, host processors, baseband processor integrated circuits, application specific integrated circuits, central processing units (CPUs), graphics processing units (GPUs), etc.). Control circuitry 44 may be configured to perform operations in device 10 using hardware (e.g., dedicated hardware or circuitry), firmware, and/or software. Software code for performing operations on UE device 10 may be stored on storage circuitry 46 (e.g., storage circuitry 46 may include non-transitory (tangible) computer readable storage media that stores the software code). The software code may sometimes be referred to as program instructions, software, data, instructions, or code. Software code stored on storage circuitry 46 may be executed by processing circuitry 48.

Control circuitry 44 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 44 may be used in implementing communications protocols. Communications protocols that may be implemented using control circuitry 44 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), satellite communications protocols, or any other desired communications protocols. Each communications protocol may be associated with a corresponding radio access technology (RAT) that specifies the physical connection methodology used in implementing the protocol.

UE device 10 may store satellite information associated with one or more of the satellites 12 in satellite constellation 32 on storage circuitry 46. The satellite information, sometimes referred to herein as ephemeris data, may include a satellite almanac identifying the orbital parameters/position (e.g., orbit information, elevation information, altitude information, inclination information, eccentricity information, orbital period information, trajectory information, right ascension information, declination information, ground track information, etc.) and/or the velocity of satellites 12 (e.g., relative to the surface of Earth). This information may include a two-line element (TLE), for example. The TLE may identify (include) information about the orbital motion of one or more of the satellites 12 in satellite constellation 32 (e.g., satellite epoch, first and/or second derivatives of motion, drag terms, etc.). The TLE may be in the format of a text file having two lines or columns that include the set of elements forming the TLE, for example. Control circuitry 44 may use the ephemeris data to calculate, predicting, or identifying the location of satellites 12 at a given point in time.

UE device 10 may also include wireless circuitry to support wireless communications. The wireless circuitry may include one or more antennas 54 and one or more radios 52. Each radio 52 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 54. The components of each radio 52 may be mounted onto a respective substrate or integrated into a respective integrated circuit, chip, package, or system-on-chip (SOC). If desired, the components of multiple radios 52 may share a single substrate, integrated circuit, chip, package, or SOC.

Antenna(s) 54 may be formed using any desired antenna structures. For example, antenna(s) 54 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. If desired, one or more antennas 54 may include antenna resonating elements formed from conductive portions of housing 42 (e.g., peripheral conductive housing structures extending around a periphery of a display on UE device 10). Filter circuitry, switching circuitry, impedance matching circuitry, and/or other antenna tuning components may be adjusted to adjust the frequency response and wireless performance of antenna (s) 54 over time. If desired, multiple antennas 54 may be implemented as a phased array antenna (e.g., where each antenna forms a radiator or antenna element of the phased array antenna, which is sometimes also referred to as a phased antenna array). In these scenarios, the phased array antenna may convey radio-frequency signals within a signal beam. The phases and/or magnitudes of each radiator in the phased array antenna may be adjusted so the radio-frequency signals for each radiator constructively and destructively interfere to steer or orient the signal beam in a particular pointing direction (e.g., a direction of peak signal gain). The signal beam may be adjusted or steered over time.

Transceiver circuitry in radios 52 may convey radio-frequency signals using one or more antennas 54 (e.g., antenna(s) 54 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 54 may transmit the radio-frequency signals by radiating the radio-frequency signals into free space (or to free space through intervening device structures such as a dielectric cover layer). Antenna(s) 54 may additionally or alternatively receive the radio-frequency signals from free space (e.g., through intervening devices structures such as a dielectric cover layer). The transmission and reception of radio-frequency signals by antenna(s) 54 each involve the excitation or resonance of antenna currents on an antenna resonating element in the antenna by the radio-frequency signals within the frequency band(s) of operation of the antenna.

Each radio 52 may be coupled to one or more antennas 54 over one or more radio-frequency transmission lines. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. The radio-frequency transmission lines may be integrated into rigid and/or flexible printed circuit boards if desired. One or more of the radio-frequency lines may be shared between radios 52 if desired. Radio-frequency front end (RFFE) modules may be interposed on one or more of the radio-frequency transmission lines. The radio-frequency front end modules may include substrates, integrated circuits, chips, or packages that are separate from radios 52 and may include filter circuitry, switching circuitry, amplifier circuitry, impedance matching circuitry, radio-frequency coupler circuitry, and/or any other desired radio-frequency circuitry for operating on the radio-frequency signals conveyed over the radio-frequency transmission lines.

Radios 52 may use antenna(s) 54 to transmit and/or receive radio-frequency signals within different frequency bands at radio frequencies (sometimes referred to herein as communications bands or simply as a "bands"). The frequency bands handled by radios 52 may include satellite communications bands (e.g., the C band, S band, L band, X band, W band, V band, K band, $K_a$ band, $K_u$ band, etc.), wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

While control circuitry 44 is shown separately from radios 52 in the example of FIG. 2 for the sake of clarity, radios 52 may include processing circuitry that forms a part of processing circuitry 48 and/or storage circuitry that forms a part of storage circuitry 46 of control circuitry 44 (e.g., portions of control circuitry 44 may be implemented on radios 52). As an example, control circuitry 44 may include baseband circuitry or other control components that form a part of radios 52. The baseband circuitry may, for example, access a communication protocol stack on control circuitry 44 (e.g., storage circuitry 46) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

UE device 10 may include input-output devices 50. Input-output devices 50 may be used to allow data to be supplied to UE device 10 and to allow data to be provided from UE device 10 to external devices. Input-output devices 50 may include user interface devices, data port devices, and other input-output components. For example, input-output devices 50 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 50 may be peripherals that are coupled to a main processing unit or other portion of device 10 via a wired or wireless link). UE device 10 may be owned and/or operated by an end user.

Figure 3:
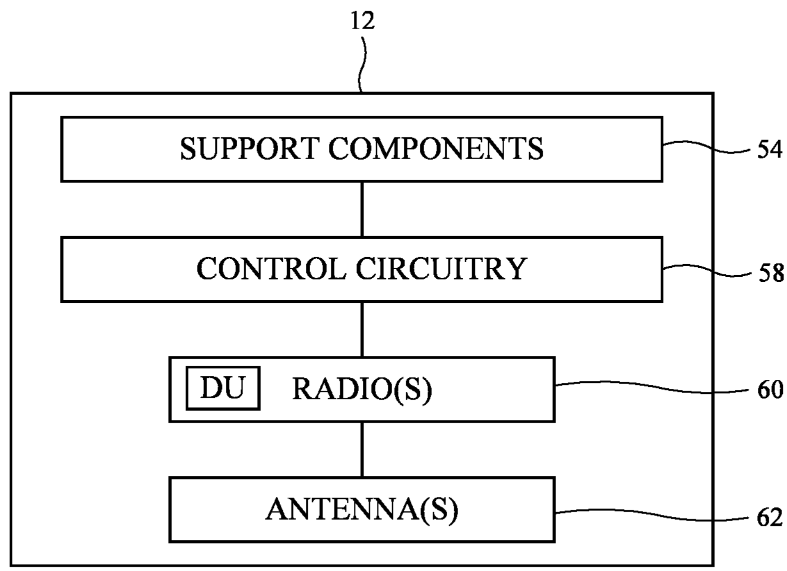
FIG. 3 is a schematic diagram of an illustrative communications satellite in accordance with some embodiments.

FIG. 3 is a diagram of an illustrative satellite 12 in communications system 38. As shown in FIG. 3, satellite 12 may include satellite support components 56. Support components 56 may include batteries, solar panels, sensors (e.g., accelerometers, gyroscopes, temperature sensors, light sensors, etc.), guidance systems, propulsion systems, and/or any other desired components associated with supporting satellite 12 in orbit above Earth.

Satellite 12 may include control circuitry 58. Control circuitry 58 may be used in controlling the operations of satellite 12. Control circuitry 58 may include processing circuitry such as processing circuitry 48 of FIG. 2 and may include storage circuitry such as storage circuitry 46 of FIG. 2. Control circuitry 58 may also control support components 56 to adjust the trajectory or position of satellite 12 in space.

Satellite 12 may include antennas 62 and one or more radios 60. Radios 60 may use antennas 62 to transmit DL signals 26 and DL signals 30 and to receive UL signals 24 and UL signals 28 of FIG. 1 (e.g., in one or more satellite communications bands). Radios 60 may include transceivers, modems, integrated circuit chips, application specific integrated circuits, filters, switches, up-converter circuitry, down-converter circuitry, analog-to-digital converter circuitry, digital-to-analog converter circuitry, amplifier circuitry (e.g., multiport amplifiers), beam steering circuitry, etc.

The communication functions of satellite 12 and a corresponding gateway 14 may be characterized by radio unit (RU) functions, distributed unit (DU) functions, and control unit (CU) functions. The RU functions include low level functions (e.g., PHY functions) associated with radio-frequency transmission and reception. The DU functions (sometimes referred to simply as the DU) involve all functions linked to data communications/transfer between the UE devices and satellite 12 such as radio link control (RLC) functions, packet data convergence protocol (PDCP) functions, service data adaptation protocol (SDAP) functions (e.g., functions that effectively form a pipeline for data transfer), physical layer (PHY) functions, and media access control (MAC) functions. The CU functions (sometimes referred to simply as the CU) are responsible for control configuration for communications such as radio resource control (RRC) functions, PDCP-C functions, CU-CP functions, etc. The DU and the CU may, for example, be defined by the Open RAN standards for cellular radio-access networks.

Rather than simply relaying data transmitted by gateway 14 or UE device 10, satellite 12 may also generate and transmit some information to UE devices 10. Such information may include reference signals and synchronization signals (e.g., system synchronization and information blocks), paging signals, PRACH messages or responses, PDSCH messages, etc. Radios 60 may implement DU functions for the transmission of this information, whereas gateway 14 may retain the CU functions for transmission of the information by satellite 12. Radios 60 may include hardware that implements the DU functions (e.g., signal generators, transmitters, modulators, mixers, amplifiers, etc.).

Antennas 62 may include any desired antenna structures (e.g., patch antenna structures, dipole antenna structures, monopole antenna structures, waveguide antenna structures, Yagi antenna structures, inverted-F antenna structures, cavity-backed antenna structures, combinations of these, etc.). In one suitable arrangement, antennas 62 may include one or more phased array antennas. Each phased array antenna may include beam forming circuitry having a phase and magnitude controller coupled to each antenna element in the phased array antenna. The phase and magnitude controllers may provide a desired phase and magnitude to the radio-frequency signals conveyed over the corresponding antenna element. The phases and magnitudes of each antenna element may be adjusted so that the radio-frequency signals conveyed by each of the antenna elements constructively and destructively interfere to produce a radio-frequency signal beam (e.g., a spot beam) in a desired pointing direction (e.g., an angular direction towards Earth at which the radio-frequency signal beam exhibits peak gain). Radio-frequency lenses may also be used to help guide the radio-frequency signal beam in a desired pointing direction. Each radio-frequency signal beam also exhibits a corresponding beam width. This allows each radio-frequency signal beam to cover a corresponding area on Earth (e.g., a region on Earth overlapping the radio-frequency signal beam such that the radio-frequency signal beam exhibits a power greater than a minimum threshold value within that region/cell). Satellite 12 may convey radio-frequency signals over multiple concurrently-active signal beams if desired. If desired, satellite 12 may offload some or all of its beam forming operations to gateway 14. The signal beams may sometimes be referred to herein simply as beams.

If desired, radios 60 and antennas 62 may support communications using multiple polarizations. For example, radios 60 and antennas 62 may transmit and receive radio-frequency signals with a first polarization (e.g., a left-hand circular polarization (LHCP)) and may transmit and receive radio-frequency signals with a second polarization (e.g., a right-hand circular polarization (RHCP)). Antennas 62 may be able to produce a set of different signal beams at different beam pointing angles (e.g., where each beam overlaps a respective cell on Earth). The set of signal beams may include a first subset of signal beams that convey LHCP signals (e.g., LHCP signal beams) and a second subset of signal beams that convey RHCP signals (e.g., RHCP signal beams). The LHCP and RHCP signal beams may, for example, be produced using respective multiport power amplifiers (MPAs) on satellite 12. This is merely illustrative and, in general, satellite 12 may produce any desired number of signal beams having any desired polarizations.

Figure 4:
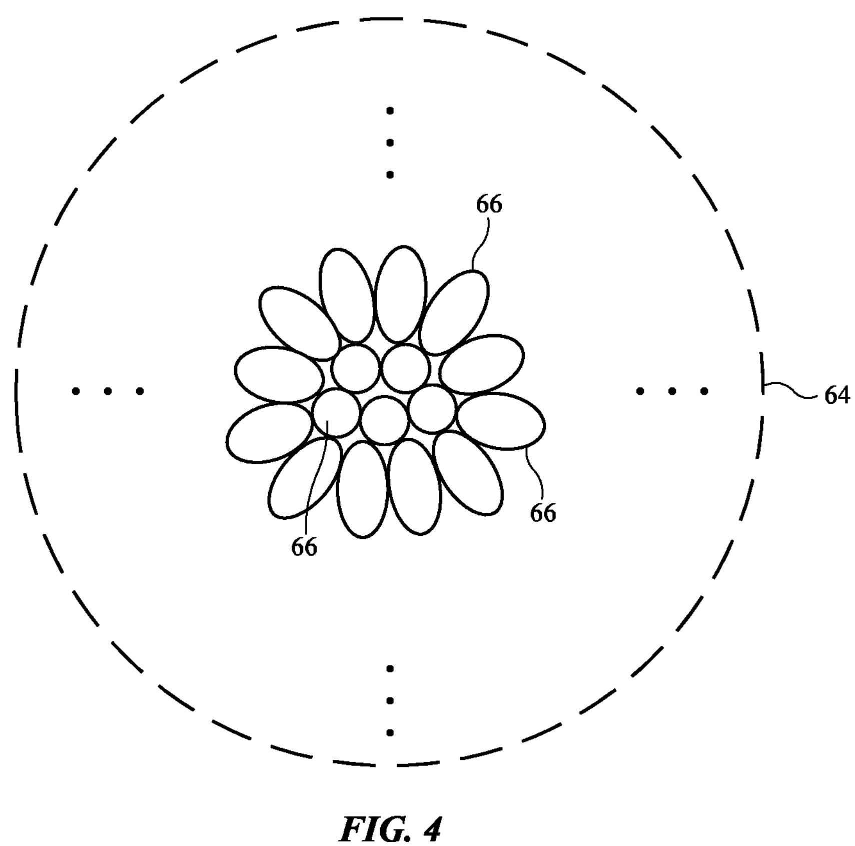
FIG. 4 is a diagram showing how an illustrative communications satellite may communicate using different signal beams within a coverage area in accordance with some embodiments.

FIG. 4 is a top-down diagram (e.g., a bird's eye view of the surface of Earth) showing how a given satellite 12 may convey radio-frequency signals over different beams. As shown in FIG. 4, satellite 12 may convey radio-frequency signals within a set of beams 66 (e.g., a set of beams formable by the antennas 62 on satellite 12). The set may include any desired number of beams 66 (e.g., two beams, 2-16 beams, tens of beams, dozens of beams, hundreds of beams, thousands of beams, etc.). Each beam 66 may be oriented in a different respective beam pointing direction. As such, each beam 66 may overlap a different respective area on Earth (sometimes referred to herein as spot beams, beam footprints, or footprints). The footprints of beams 66 on Earth are illustrated in FIG. 4. UE devices 10 that overlap the footprint of a given beam 66 may sometimes be referred to as being in, within, or of that beam 66. All of the beams 66 may collectively cover a coverage area or region 64 on Earth.

Beams 66 that are located farther from boresight (e.g., the center of region 64) may have a more elongated or distorted shape and may therefore cover more area on Earth than beams 66 that are located closer to boresight. To provide that each of the beams 66 across region 64 with uniform power density, satellite 12 may transmit radio-frequency signals with higher transmit power levels in beams 66 at higher elevation angles (e.g., beams farther from boresight) than in beams 66 at lower elevation angles. Satellite 12 may transmit and/or receive radio-frequency signals within one or more beam 66 at a given time. Since the amount of power on satellite 12 is finite, satellite 12 may form beams 66 with more power-per-beam when fewer beams 66 are concurrently active than when more beams 66 are concurrently active. In general, satellite 12 may serve different beam footprints using any desired combination of spatial multiplexing, time multiplexing, and frequency multiplexing. Satellite 12 may, for example, perform a time-division duplexing beam hopping operation to selectively activate different beams 66 at any given time until each beam 66 in region 64 has been active at least once for a given period. This beam hopping operation may be performed according to a beam hopping schedule that dictates which beams are active at different times (e.g., the order and duration of activation (dwell time) for each beam). By selectively activating each of the beams at different times, the entire region 64 may be covered by satellite 12 with sufficiently high power-per-beam.

Wireless communications systems such as communications system 38 (FIG. 1) may be used to deliver a variety of communication services to UE devices 10 such as text messages, video, voice, and other data. A standardized communications protocol may be used to manage connectivity to a given UE device 10 (e.g., a 4G protocol, a 5G protocol, etc.). The communications protocol may define the functions and operation of a base station (gNB) that provides communication services to the UE device.

In terrestrial-based cellular networks, a terrestrial base station is used to provide communications services to the UE device according to the communications protocol. In non-terrestrial networks such as NTN 40 of FIG. 1, satellites 12/12G serve as the base station (e.g., perform the functions and operations of the base station as defined according to the communications protocol) to deliver communication services to the UE device. In other words, the satellites may replace the terrestrial base stations to serve as high-altitude base stations (gNBs) for the UE device. UE devices 10 may include hardware (e.g., in radios 52 of FIG. 2) that is optimized or otherwise configured to support the standardized communications protocol. As such, having the satellites serve as a base station (as defined by the communications protocol) may allow UE devices 10 to communicate with the satellites using the same or similar hardware as if the UE devices only communicated with terrestrial base stations.

The communications protocol may specify that the base station periodically transmit a synchronization signal block (SSB) within each of its beams. The UE devices may the SSBs and may use the SSBs to synchronize the time and frequency resources of the UE devices to the time and frequency resources of the base station and thus the overall network. Once the UE devices have been synchronized to the base station, the UE devices can perform further communications with the base station (e.g., may register to the network to enter a connected mode or may perform other operations such as handover).

As UE devices 10 are located very far from satellites 12, the signal-to-noise ratio (SNR) of radio-frequency signals transmitted by satellites 12 is often relatively low when received at UE devices 10. The SNR can be further reduced when the UE devices are located indoors, in a user's pocket, purse, or backpack, under heavy foliage, or in the shadow of another object between the UE devices and satellites 12. To ensure successful reception and decoding of at least one SSB at each UE device despite the fact that some UE devices may be located indoors, heavy foliage, in a user's pocket, or in the shadow of an intervening object, satellites 12 may transmit multiple repetitions of the SSB (e.g., in a burst of N consecutive repetitions of the SSB). N may be, for example, 16, 32, 8, between 2 and 64, more than 64, or any other desired integer.

The periodicity with which the SSBs are transmitted by the base station within any given beam may sometimes be referred to as the SSB transmission periodicity or the SSB periodicity. The communications protocol may define the SSB periodicity to be used by the base station. Some communications protocols such as 3GPP communications protocols require the base station to transmit an SSB in each of its beams (e.g., to every UE device located in every beam footprint of the base station) at a relatively fast SSB periodicity such as 20-160 ms (e.g., where each beam transmits an SSB every 20-160 ms).

While terrestrial base stations may have sufficient power to transmit SSBs at such a fast SSB periodicity, NGSO satellites such as satellites 12 have much more limited power than terrestrial base stations. As such, it may not be feasible for satellites 12 to transmit SSBs at such a fast SSB periodicity, particularly when the satellites transmit a burst of N repetitions of the SSB. For example, if the power of satellite 12 is limited to 200 W, each beam transmission consumes around 50 W, satellite 12 has 1000 beams 66, and N=16 (e.g., assuming a duration of approximately 3 ms), the power available to satellite 12 would only support a minimum SSB periodicity of (1000/(200/50))*3 ms=750 ms, which is much slower than the slowest SSB periodicity supported by the 3GPP communications protocol (e.g., 160 ms). Put differently, satellite 12 would need 930 W of power, which is likely much greater than the power available to satellite 12, just to support an SSB periodicity of 160 ms. Additional power would still be needed to support the transmission and reception of wireless data and other signaling for UE device 10.

Figure 5:
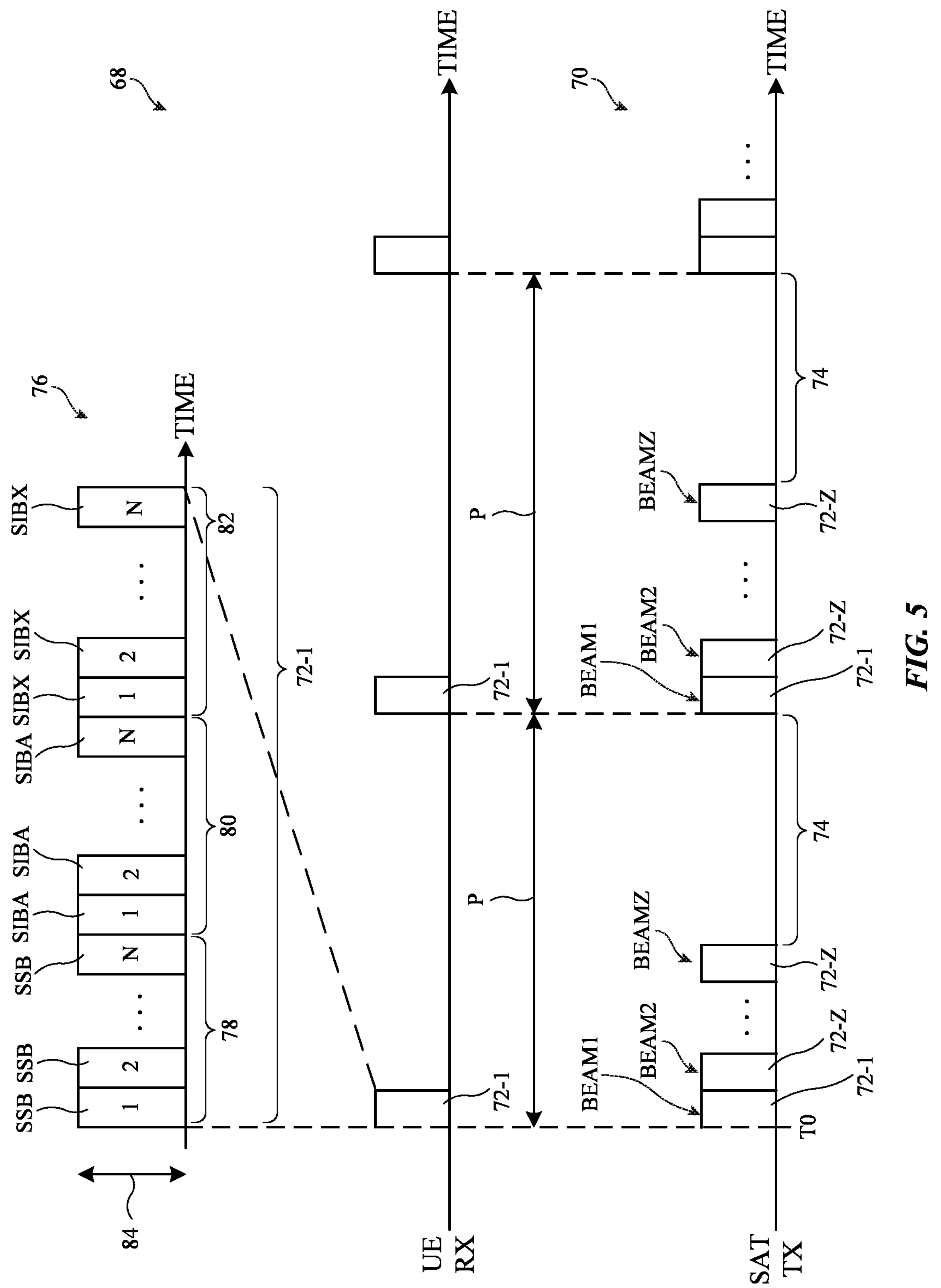
FIG. 5 is a timing diagram showing how an illustrative communications satellite may transmit system synchronization and information blocks in each of its signal beams for supporting communications with many user equipment devices in accordance with some embodiments.

The SSB periodicity implemented by satellite 12 may therefore be much slower than the 160 ms SSB periodicity of the 3GPP communications protocol. FIG. 5 is a timing diagram showing how satellite 12 may transmit SSBs with a relatively slow periodicity while still allowing the UE devices to properly connect to the network via satellite 12.

As shown in FIG. 5, diagram 70 plots the transmission timing of satellite 12 in transmitting SSBs over each of its beams. Diagram 68 plots the timing of a given UE device 10 located in a first beam 66 of satellite 12 (e.g., BEAM1) in receiving SSBs transmitted by satellite 12. As shown by diagram 70, satellite 12 may sequentially transmit system synchronization and information blocks 72 within each of its beams (e.g., from a first beam BEAM1 to a Zth beam BEAMZ) beginning at an initial time TO, such that each beam has transmitted its system synchronization and information blocks 72 within SSB period P. SSB period P may sometimes be equivalently referred to herein as an SSB periodicity or frequency (e.g., where longer SSB periods P correspond to slower SSB periodicities or frequencies and shorter SSB periods P correspond to faster SSB periodicities or frequencies). System synchronization and information blocks 72 may sometimes also be referred to herein as SSB/SIBs beams 72 or transmission (TX) information 72.

For example, at time TO, satellite 12 may transmit system synchronization and information blocks 72-1 over beam BEAM1 for a corresponding duration (e.g., 20 ms). Once satellite 12 has transmitted system synchronization and information blocks 72-1 over beam BEAM1, satellite 12 may transmit system synchronization and information blocks 72-2 over beam BEAM2. This process may continue until satellite 12 has transmitted system synchronization and information blocks 72-Z over beam BEAMZ. If desired, satellite 12 forego transmission during silent period 74 of SSB period P to help conserve power. Alternatively, satellite 12 may transmit additional system synchronization and information blocks 72 or other signals during silent period 74. Once SSB period P has elapsed, satellite 12 may re-transmit system synchronization and information blocks 72 over each of its beams in sequence during a subsequent SSB period P. This process may continue indefinitely.

Each of system synchronization and information blocks 72 may include the SSB for satellite 12, a first system information block SIBA associated with satellite 12, and a second system information block SIBX associated with satellite 12 and the corresponding beam of satellite 12. The contents and structures of the SSB and SIBA may be determined by the communications protocol, for example. The SSB may include standardized timing and frequency information to synchronize UE device 10 to the timing and frequency resources of satellite 12. System information block SIBA may define parameters for system selection (e.g., as outlined in the 3GPP protocol), timing and/or frequency information that informs the receiving UE device that it is about to receive a system information block SIBX, RACH parameters (e.g., timing information identifying when the receiving UE device can transmit a RACH preamble), and/or other system information. System information block SIBX may include, for example, current or updated ephemeris data for satellite 12 and/or other satellites in constellation 32 (e.g., the current position and velocity of satellite 12), information associated with the beam used to transmit that SIBX (e.g., information identifying the beam, the location of the beam, or the angle of the beam, a timing adjustment parameter for the beam, etc.), and/or information associated with one or more neighboring beams around the beam used to transmit that SIBX. Satellite 12 may therefore transmit a different system information block SIBX for each beam 66 (e.g., SIBX may be a beam-specific system information block, which may contain different information across the Z system synchronization and information blocks 72 transmitted by satellite 12 within SSB period P).

Plot 76 shows the contents of the system synchronization and information blocks 72-1 transmitted by satellite 12 within beam BEAM1. As shown by plot 76, system synchronization and information blocks 72-1 may have a bandwidth 84 (e.g., 10 MHz). System synchronization and information blocks 72-1 may include a burst 78 of N repetitions of the SSB, followed by a burst 80 of N repetitions of system information block SIBA, followed by a burst 82 of N repetitions of the system information block SIBX associated with beam BEAM1. Burst 78 may sometimes also be referred to herein as a set, group, block, or sub-block of N repetitions of the SSB. Burst 80 may sometimes also be referred to herein as a set, group, block, or sub-block of N repetitions of SIBA. Burst 82 may sometimes also be referred to herein as a set, group, block, or sub-block of N repetitions of SIBX.

Repeating each of the SSB, SIBA, and SIBX N times may help to ensure that every active UE devices in the corresponding beam receives at least one of the SSB, SIBA, and SIBX despite the low SNRs exhibited by the UE devices, even if one or more of the UE devices are located in a user's pocket, in a user's purse or backpack, under heavy foliage, or in the shadow of another object between the UE devices and satellite 12. The example of FIG. 5 in which bursts 78, 80, and 82 each include N repetitions is merely illustrative and, if desired, bursts 78, 80, and/or 82 may each include different numbers of repetitions. Satellite 12 may dynamically adjust the number of repetitions over time if desired (e.g., where more repetitions consume more power but increase the likelihood that all UE devices in the corresponding beam will receive SSB, SIBA, and SIBX). While repetition of SIBA and SIBX is described herein as an example, in general, satellite 12 may transmit any desired number of repetitions of any desired system blocks (SIBs).

As shown by diagram 68, UE device 10 may power on and may begin to perform a channel scan to search for a signal transmitted by satellite 12. At time TO, UE device 10 may begin to receive system synchronization and information blocks 72-1 from satellite 12, since the UE device is located within the footprint of beam BEAM1. UE device 10 may successfully receive and decode at least one SSB, at least one SIBA, and at least one SIBX in system synchronization and information blocks 72-1. UE device 10 may use the information in SSB, SIBA, and SIBX to register and connect to CN 20 via satellite 12 (FIG. 1). Prior to registering and connecting to CN 20 via satellite 12, UE device 10 is in an unconnected mode and may sometimes be referred to herein as an unconnected mode UE device. Once UE device 10 has registered and connected to CN 20 via satellite 12, UE device 10 enters a connected mode and may sometimes be referred to herein as a connected mode UE device.

Once in the connected mode, UE device 10 may convey wireless data (e.g., text messages, email messages, internet data, video call data, streaming media data, voice call data, etc.) with CN 20 via gateway(s) 14 and satellite 12 (e.g., in an active mode). While in the connected mode, UE device 10 may continue to receive and process system synchronization and information blocks 72 from satellite 12 (e.g., as transmitted every SSB period P) and may use the information in system synchronization and information blocks 72 to update how communications are performed with satellite 12 (e.g., to ensure that UE device 10 remains tightly synchronized to satellite 12 and the rest of the network as needed over time). For example, while already in the connected mode, UE device 10 may use the information received in system synchronization and information blocks 72 to remain synchronized to the network while receiving mobile-terminated (MT) services or mobile-originated (MO) services from satellite 12 and/or while performing beam handover with one or more satellites 12.

The MT services may involve the proactive transmission of wireless data from satellite 12 to UE device 10 (e.g., without UE device 10 first requesting the wireless data). Examples of MT services that may be provided to UE device 10 include an incoming video or voice call, a push notification or other alert, an incoming email or text message, etc. The MO services may involve the proactive transmission of wireless data from UE device 10 to satellite 12 (e.g., without CN 20 first requesting the wireless data). Examples of MO services that may be provided to UE device 10 include the transmission of a request for wireless data by UE device 10, an outgoing video or voice call, an outgoing email or text message, or other wireless data transmissions by UE device 10. While in the connected mode, a UE device 10 may be referred to herein as operating in an idle mode (e.g., as an idle mode UE device 10) when the UE device is not actively transmitting or receiving wireless data (e.g., payload data transmitted or received by gateway 14).

In this way, satellite 12 may ensure that all of the UE devices 10 located within any of its beams 66 receives at least one SSB, at least one SIBA, and at least one SIBX every SSB period P. SSB period P may be relatively long (e.g., longer than the SSB period given by the 3GPP protocol), thereby allowing SSB transmission to consume as little power as possible on satellite 12 while still serving each of the beams 66 of the satellite. SSB period P may be, for example 60 seconds, 30-90 seconds, 10-100 seconds, or another period.

Figure 6:
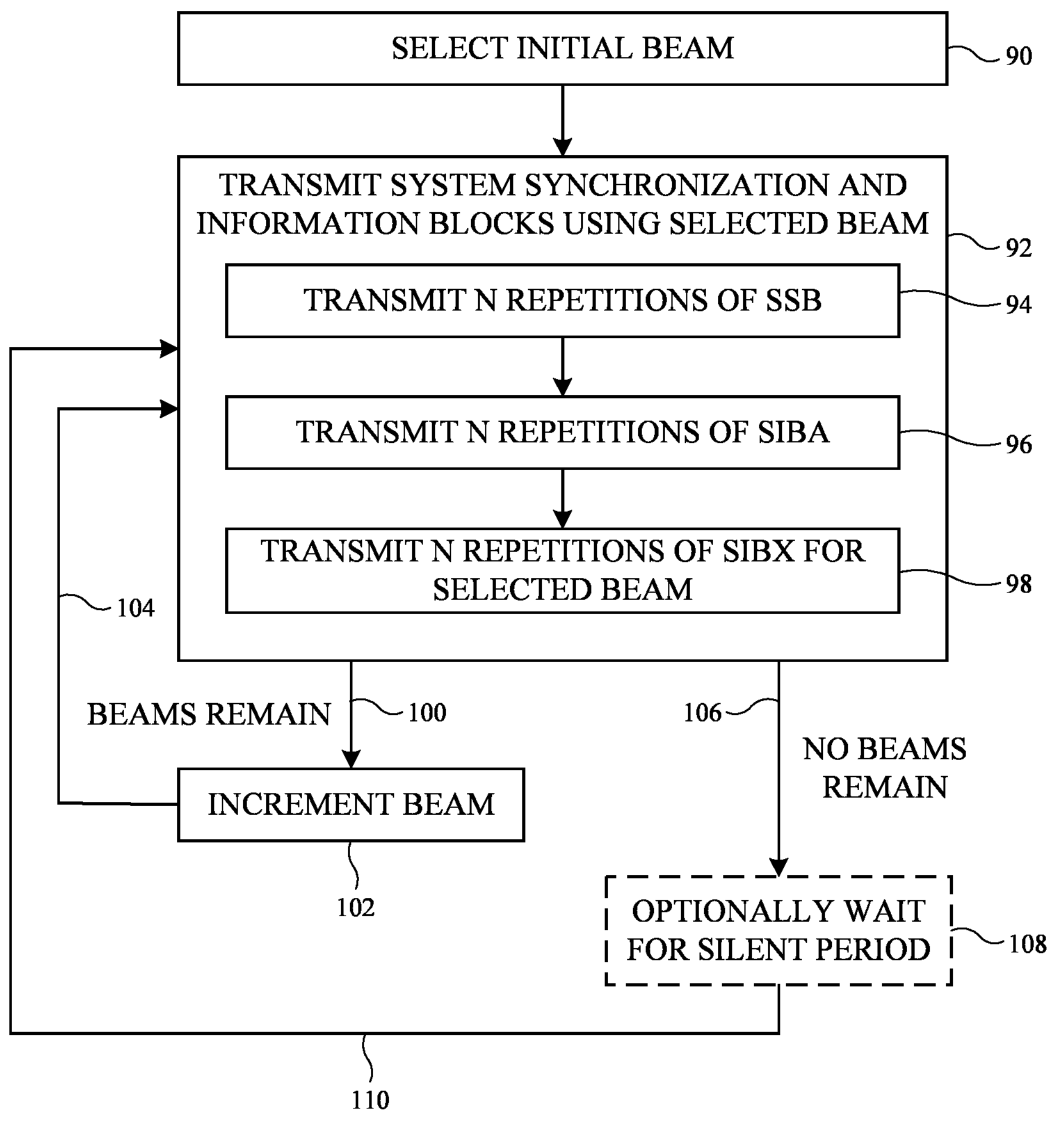
FIG. 6 is a flow chart of illustrative operations that may be performed by a communications satellite to transmit system synchronization and information blocks in each of its signal beams in accordance with some embodiments.

FIG. 6 is a flow chart of illustrative operations that may be performed by satellite 12 to transmit system synchronization and information blocks 72 within each of its signal beams 66. At operation 90, satellite 12 may select an initial beam from its set of Z formable beams 66 (e.g., beam BEAM1 of FIG. 5).

At operation 92, satellite 12 may generate and transmit system synchronization and information blocks 72 within the selected beam. In transmitting system synchronization and information blocks 72, satellite 12 may transmit burst 78 of N repetitions of the SSB (operation 94). Satellite 12 may then transmit burst 80 of N repetitions of SIBA (operation 96). Satellite 12 may then transmit burst 82 of N repetitions of the SIBX specific to the selected beam (operation 98). Any powered-on UE devices in the selected beam may search for and may receive at least one SSB from burst 80, at least one SIBA from burst 82, and at least one SIBX from burst 84.

If beams 66 remain in the set of Z beams of satellite 12, processing may proceed to operation 102 via path 100. At operation 102, satellite 12 may increment the selected beam (e.g., may select the next beam in its set of Z beams 66). Processing may then loop back to operation 92 via path 104 as satellite 12 continues to transmit system synchronization and information blocks 72 in each of its beams. Once no beams remain in the set of beams (e.g., once synchronization and information blocks 72-Z of FIG. 5 have been transmitted over beam BEAMZ), processing may proceed to optional operation 108 via path 106.

At optional operation 106, satellite 12 may wait for silent period 74 without transmitting any synchronization and information blocks 72. Processing may loop back to operation 92 via path 110 (e.g., after SSB period P has elapsed from the first iteration of operation 92) and satellite 12 may re-transmit system synchronization and information blocks 72 in each of its beams. The example of FIGS. 5 and 6 in which satellite 12 sequentially transmits system synchronization and information blocks 72 in only one beam 66 at a time is illustrative and non-limiting. If desired, satellite 12 may concurrently transmit system synchronization and information blocks 72 within any desired set of two or more beams 66 (e.g., such that each beam receives its system synchronization and information blocks 72 once every SSB period P).

Figure 7:
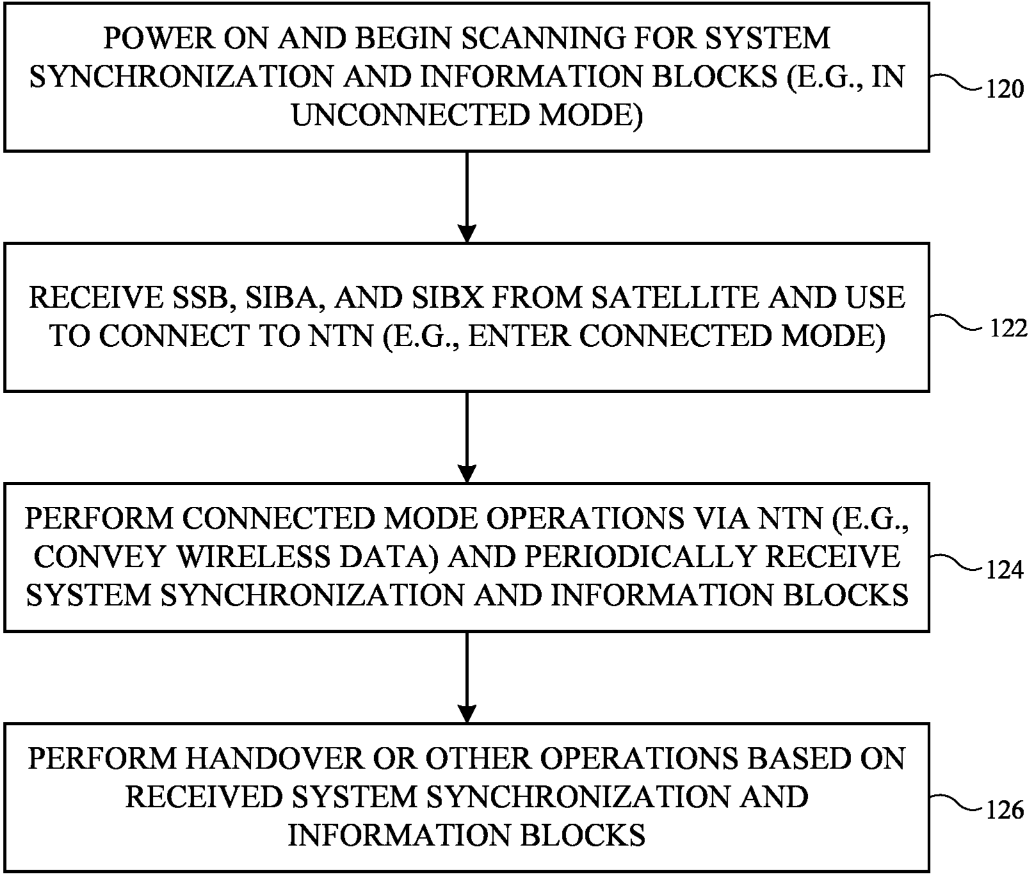
FIG. 7 is a flow chart of illustrative operations that may be performed by a user equipment device to communicate with a communications satellite using system synchronization and information blocks received from the communications satellite in accordance with some embodiments.

FIG. 7 is a flow chart of illustrative operations that may be performed by a UE device 10 in a beam footprint of satellite 12 to communicate with satellite 12. The operations of FIG. 7 may be performed concurrently with the operations of FIG. 6 performed by satellite 12, for example.

At operation 120, UE device 10 may power on and may begin scanning (e.g., over frequencies or channels) for system synchronization and information blocks 72 transmitted by satellite 12. UE device 10 is in the unconnected mode at this time and is therefore potentially out of time synchronization with satellite 12.

At operation 122, UE device 10 may receive system synchronization and information blocks 72 from satellite 12. The time required for UE device to complete its scan and to receive system synchronization and information blocks 72 may depend on how old the ephemeris data stored on UE device 10 is. In a worst-case scenario, UE device 10 will wait no longer than SSB period P before it receives system synchronization and information blocks 72.

The N repetitions of each of the SSB, SIBA, and SIBX in system synchronization and information blocks 72 may ensure that UE device 10 is able to successfully receive and decode at least one SSB, at least one SIBA, and at least one SIBX from the system synchronization and information blocks 72 transmitted by satellite 12, despite the long path length between UE device 10 and satellite 12 and despite the presence of other intervening objects between UE device 10 and satellite 12 (e.g., even if the UE devices is located in a user's pocket). UE device 10 may use the received SSB, SIBA, and SIBX to connect to NTN 40 (e.g., to perform a registration procedure). For example, UE device 10 may use timing information, frequency information, and/or ephemeris data in the received SSB, SIBA, and SIBX to convey radio-frequency signals via satellite 12 and gateway(s) 14 that serve to register UE device 10 with CN 20 (FIG. 1). This may place UE device in the connected mode.

At operation 124, UE device 10 may perform connected mode operations with NTN 40. This may involve UE device 10 transmitting wireless data to CN 20 via gateway(s) 14 and satellite 12 and/or receiving wireless data from CN 20 via gateway(s) 14 and satellite 12. The wireless data may include wireless data associated with MO and/or MT services provided to UE device 10 by satellite 12. Satellite 12 may continue to transmit system synchronization and information blocks 72 within each of its beams 66 while UE device 10 is in the connected mode (e.g., UE device 10 may continue to receive the system synchronization and information blocks 72 transmitted by satellite 12 in its corresponding beam while in the connected mode every SSB period P).

At operation 126, UE device 10 may perform handover operations or other communications operations based on system synchronization and information blocks 72 (e.g., as received while in the unconnected mode or while in the connected mode). For example, UE device 10 may use the timing information, frequency information, and/or ephemeris data in the received SSB, SIBA, and SIBX of system synchronization and information blocks 72 to ensure that the wireless data continues to be satisfactorily transmitted and/or received between UE device 10 and satellite 12 (e.g., while satellite 12 provides MO and/or MT services to UE device 10). UE device 10 may additionally or alternatively use the information in the received SSB, SIBA, and SIBX of system synchronization and information blocks 72 to transmit signals to and/or to receive signals from satellite 12 for use in performing a handover from the current beam serving UE device 10 to another beam of satellite 12 or a different satellite. For example, UE device 10 may use the information in system synchronization and information blocks 72 to request SSB transmissions from satellite 12 or other satellites in constellation 32 for use in performing handover. UE device 10 may gather measurements (e.g., wireless performance metric data) from the SSB transmissions for use in performing handover.

While UE devices 10 are in the connected mode, satellite 12 may provide MT services to the UE devices. The MT services may involve the proactive transmission of wireless data from satellite 12 to the UE devices 10 (e.g., an incoming video or voice call, a push notification or other alert, an incoming email or text message, etc.). In providing MT services, satellite 12 may transmit paging signals to UE device(s) 10 in its signal beams 66. When in the idle mode, connected mode UE devices 10 keep their receivers powered off, disabled, inactive, or idle most of the time to conserve power, while periodically waking to scan for paging signals transmitted by satellite 12. The paging signals may serve to inform UE devices 10 that CN 20 has incoming wireless data (e.g., forward link data) to transmit to UE device 10, thereby instructing the UE devices 10 to keep their receivers powered on, enabled, or active to receive the incoming wireless data. The paging signals may also help to coordinate the time and frequency resources with which the UE devices are to receive the incoming wireless data. However, if care is not taken, the relatively long SSB period P implemented by satellite 12 to conserve power may cause UE devices 10 to drift out of synchronization with satellite 12 by the time satellite 12 transmits a paging signal for the UE devices.

Figure 8:
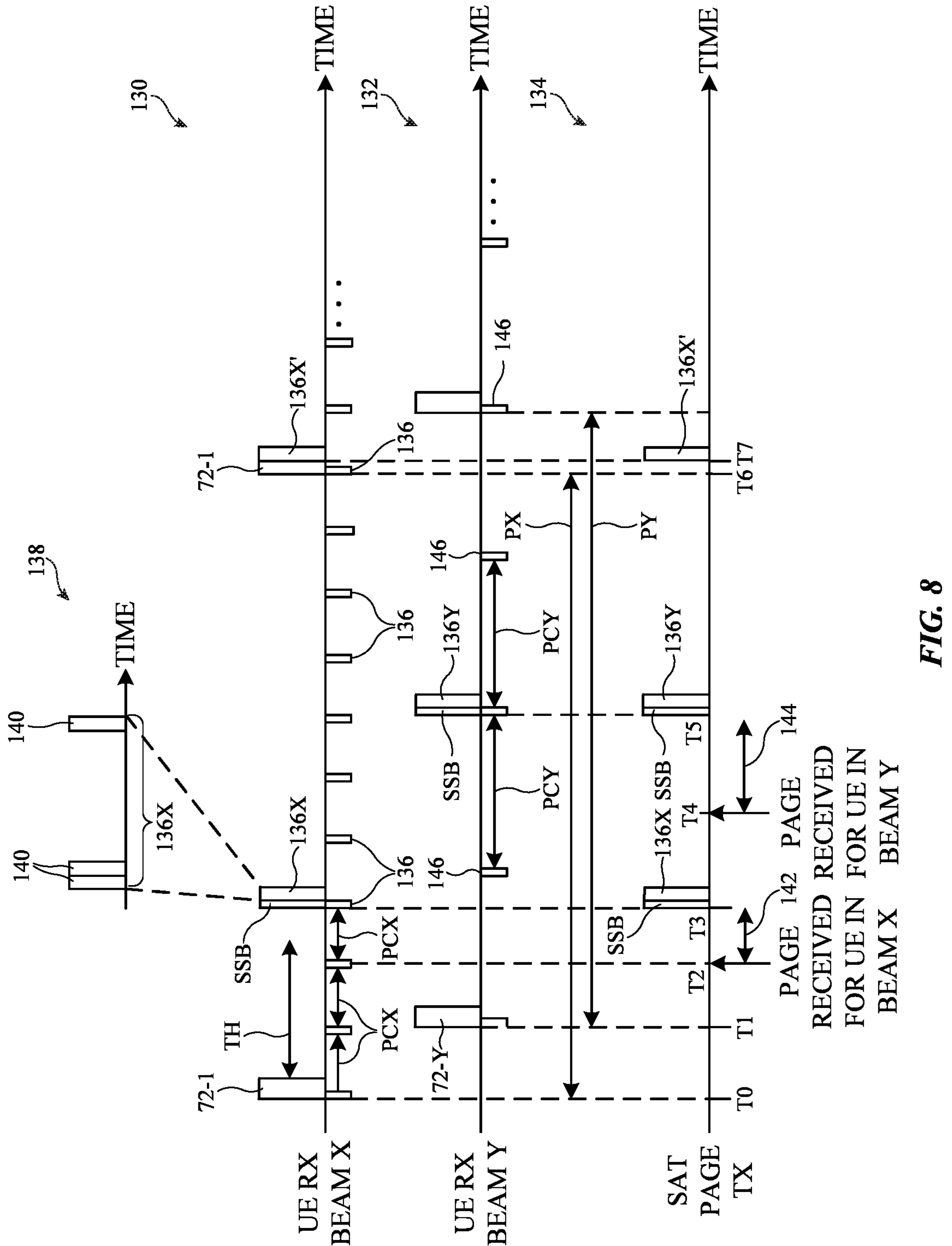
FIG. 8 is a timing diagram showing how an illustrative communications satellite may transmit paging signals to provide mobile-terminated (MT) services to user equipment devices in accordance with some embodiments.

FIG. 8 is a timing diagram showing how satellite 12 may maximize synchronization between UE devices 10 and satellite 12 for the MT services provided to UE devices 10 by satellite 12. As shown in FIG. 8, diagram 134 plots the transmission timing of satellite 12 in transmitting paging signals 136 for MT services. While satellite 12 may continue to transmit system synchronization and information blocks 72 in each of its beams every SSB period P, the transmission of system synchronization and information blocks 72 is not shown in diagram 134 for the sake of clarity. Diagram 130 plots the timing of a first UE device in a first beam BEAMX of satellite 12 in receiving paging signals from satellite 12. Diagram 132 plots the timing of a second UE device in a second beam BEAMY of satellite 12 in receiving paging signals from satellite 12. The first and second UE devices may both be in the idle mode.

As shown in diagram 130, the first UE device 10 may receive system synchronization and information blocks 72-1 transmitted by satellite 12 in beam BEAMX beginning at time TO and periodically after every SSB period PX has elapsed (e.g., again at time T6, again at time T6+P, etc.). As shown in diagram 132, the second UE device 10 may receive system synchronization and information blocks 72-Y transmitted by satellite 12 in beam BEAMY beginning at time T1 and periodically after every SSB period PY has elapsed (SSB period PY may be equal in duration/magnitude to SSB period PX but may be offset in time corresponding to when satellite 12 transmits system synchronization and information blocks 72 in each of the beams). The time offset between the beginning of the SSB period for two different beams may sometimes be referred to herein as an SSB offset (e.g., the SSB offset between beam BEAMY and beam BEAMX may be equal to T1−T0).

Satellite 12 may define a different respective paging cycle PC for each of its beams 66 (e.g., different paging cycle configurations may be used in different beam footprints). The paging cycle dictates when and how often an idle mode UE device is to wake, activate, enable, or power on its receiver to listen for the potential reception of paging signals 136 from satellite 12. In general, shorter paging cycles involve more UE power consumption because shorter paging cycles involve turning on the receiver of the UE device to listen for paging signals 136 more frequently than longer paging cycles. On the other hand, shorter paging cycles will on average result in a UE device receiving an incoming paging signal 136 more quickly than longer paging cycles, thereby reducing the time required for the UE device to begin receiving its incoming wireless data. Since the paging cycle length only impacts UE device wake-up cycles, changing the paging cycle length has no impact on radio resource usage between satellite 12 and the UE device.

Satellite 12 may inform the UE devices in its beams 66 of the corresponding paging cycle using system synchronization and information blocks 72. For example, the system information block SIBA (FIG. 5) in system synchronization and information blocks 72-1 may identify a first paging cycle PCX for UE devices in beam BEAMX such as the first UE device illustrated by diagram 130. As shown by diagram 130, after receiving system synchronization and information blocks 72-1 at time T0, the first UE device may wake, activate, enable, or power on its receiver to listen for the potential reception of paging signals from satellite 12 during wake-up (paging) periods 137. Wake-up periods 137 may be separated in time by the first paging cycle PCX identified by system synchronization and information blocks 72-1.

Similarly, the system information block SIBA (FIG. 5) in system synchronization and information blocks 72-Y may identify a second paging cycle PCY for UE devices in beam BEAMY such as the second UE device illustrated by diagram 132. As shown by diagram 132, after receiving system synchronization and information blocks 72-Y at time T1, the second UE device may wake, activate, enable, or power on its receiver to listen for the potential reception of paging signals from satellite 12 during wake-up (paging) periods 146. Wake-up periods 146 may be separated in time by the second paging cycle PCY identified by system synchronization and information blocks 72-Y.

In providing MT services to UE devices 10, satellite 12 may receive pages from CN 20 via gateway 14 for transmission to one or more idle mode UE devices in any of its beams 66 (e.g., when incoming wireless data is available for transmission to those UE devices). For example, as shown by diagram 134, at time T2 satellite 12 may receive a page (sometimes referred to herein as a paging message) from gateway 14 for the first UE device 10 located in beam BEAMX. Since satellite 12 has knowledge of the timing of the wake-up periods 137 of the UE devices in beam BEAMX, satellite 12 may use beam BEAMX to transmit the received page within paging signal 136X at the time of the next wake-up period 137 of the UE devices in beam BX occuring after time T2 (e.g., satellite 12 may transmit paging signal 136X in beam BEAMX at time T3). In other words, satellite 12 may delay transmission of paging signal 136X from reception of the page at satellite 12 by duration 142, until the next time the satellite knows that the first UE device 10 will be awake and listening for paging signals.

Similarly, as shown by diagram 132, at time T4 satellite 12 may receive a page from gateway 14 for the second UE device 10 located in beam BEAMY. Since satellite 12 has knowledge of the timing of the wake-up periods 146 of the UE devices in beam BEAMY, satellite 12 may use beam BEAMY to transmit the received page within paging signal 136Y at the time of the next wake-up period 146 of the UE devices in beam BY subsequent to time T4 (e.g., satellite 12 may transmit paging signal 136Y in beam BEAMY at time T5). In other words, satellite 12 may delay transmission of paging signal 136X from reception of the page at satellite 12 by duration 144, until the next time the satellite knows that the second UE device 10 will be awake and listening for paging signals.

In this way, paging is distributed in time (as and when a page is received for a UE device) and the maximum wait time for satellite 12 to transmit a received page using a corresponding paging signal 136 (e.g., the maximum magnitude of durations 142 and 144) is the paging cycle PC of the beam used to transmit the paging signal (e.g., paging cycle PCX for beam BEAMX, paging cycle PCY for beam BEAMY, etc.). There may therefore be a tradeoff between the length of paging cycle PC and UE power consumption, while allowing for a relatively high paging capacity. If desired, satellite 12 may bundle multiple pages for different UE devices in a given beam in a burst to optimize power consumption on satellite 12.

Plot 138 shows the contents of the paging signal 136X transmitted by satellite 12 within beam BEAMX. As shown by plot 138, paging signal 136X may include a burst, set, group, or block of repetitions of page 140 for the first UE device in beam BEAMX (e.g., N repetitions, N PDSCH repetitions and M physical downlink control channel (PDCCH) repetitions, or another number of repetitions). Page 140 may be the page received by satellite 12 from gateway 14 and may sometimes be referred to herein as paging message 140. Repeating page 140 may help to ensure that the first UE device in beam BEAMX receives at least one of the pages 140 despite the low SNR exhibited by the first UE device, even if the first UE device is located in a user's pocket, in a user's purse or backpack, under heavy foliage, or in the shadow of another object between the UE devices and satellite 12.

To further ensure the synchronization of connected mode UE devices 10 to satellite 12, satellite 12 may append an SSB to the beginning of each transmitted paging signal 136. For example, satellite 12 may append an SSB to the beginning of paging signal 136X at time T3 and may append an SSB to the beginning of paging signal 136Y at time T5. In general, when satellite 12 transmits a paging signal 136 to a given UE device 10 in a given beam 66, every connected mode UE device in that beam will also receive the paging signal (e.g., because every connected mode UE device will wake at the same time according to the corresponding paging cycle PC).

As such, every UE device 10 in beam BEAMX will receive paging signal 136X and its appended SSB at time T3. The UE devices in beam BEAMX may use the received SSB to re-synchronize or otherwise ensure that the UE devices are currently synchronized with satellite 12. This may help to mitigate any timing drift between the UE devices and satellite 12 that occurred since reception of the last system synchronization and information blocks 72-1. Similarly, every UE device 10 in beam BEAMY will receive paging signal 136Y and its appended SSB at time T5. The UE devices in beam BEAMY may use the received SSB to re-synchronize or otherwise ensure that the UE devices are currently synchronized with satellite 12. This may help to mitigate any timing drift between the UE devices and satellite 12 that occurred since reception of the last system synchronization and information blocks 72-Y.

In other words, satellite 12 may leverage the transmission of paging signals to a single UE device in a given beam to also update the timing synchronization of all connected mode UE devices in that beam. This may help the UE devices to remain synchronized to satellite 12 over time despite the fact that the SSB period P is otherwise very long (e.g., as required to minimize power consumption on satellite 12 as shown in FIG. 5). Without appending the SSB to paging signals 136, the UE devices may otherwise have to wait as long as 30-60 seconds to receive fresh synchronization information from satellite 12.

Since only connected mode UE devices receive paging signal 136, only a single SSB may be appended to the paging signal (e.g., there need not be N repetitions of the paging signal as in system synchronization and information blocks 72), as there is a low probability that connected mode UE devices are located in a user's pocket, in a user's purse or backpack, under heavy foliage, or in the shadow of another object between the UE devices and satellite 12. However, if desired, satellite 12 may append a set of N SSBs or any other desired number of SSBs to the beginning of paging signal 136. The paged UE device(s) may use the updated synchronization to help ensure proper reception and decoding of the following paging signal. Both the paged UE device(s) and the un-paged UE device(s) that received the paging signal may use the updated synchronization to ensure proper transmission and/or reception of wireless data during subsequent MT services, MO services, and/or handover operations that may be performed with satellite 12 (e.g., at operation 126 of FIG. 7).

If desired, satellite 12 may forego transmission of an SSB appended to paging signals 136 in a given beam when the paging signals are transmitted sufficiently close to transmission of the last system synchronization and information blocks 72 for that beam. For example, satellite 12 may append the SSB to paging signals 136X for a given beam when more than a threshold time period TH has elapsed since transmission of the last system synchronization and information blocks 72 in that beam. As shown in diagram 130, since the time T3 at which beam BEAMX receives paging signal 136X is more than threshold time period TH from the last transmission of system synchronization and information blocks 72-1 at time TO, satellite 12 may append the SSB to the paging signal 136X transmitted at time T3. However, for a paging signal 136X' transmitted in beam BEAMX at a time T7, which is less than threshold time period TH from the transmission of system synchronization and information blocks 72-1 at time T6, satellite 12 may transmit paging signal 136X' in beam BEAMX without the SSB. Since paging signal 136X' is transmitted less than threshold time period TH from transmission of the last system synchronization and information blocks 72-1 at time T6, the UE devices in beam BEAMX may already be tightly synchronized to satellite 12 at the time of transmission of paging signal 136X' (e.g., from the SSB(s) received in synchronization and information blocks 72-1) and re-transmitting the SSB with paging signal 136X' may be redundant and consume unnecessary power on satellite 12. Threshold time period TH may be 50 ms, 20-70 ms, 10-100 ms, or other time periods, as examples.

Figure 9:
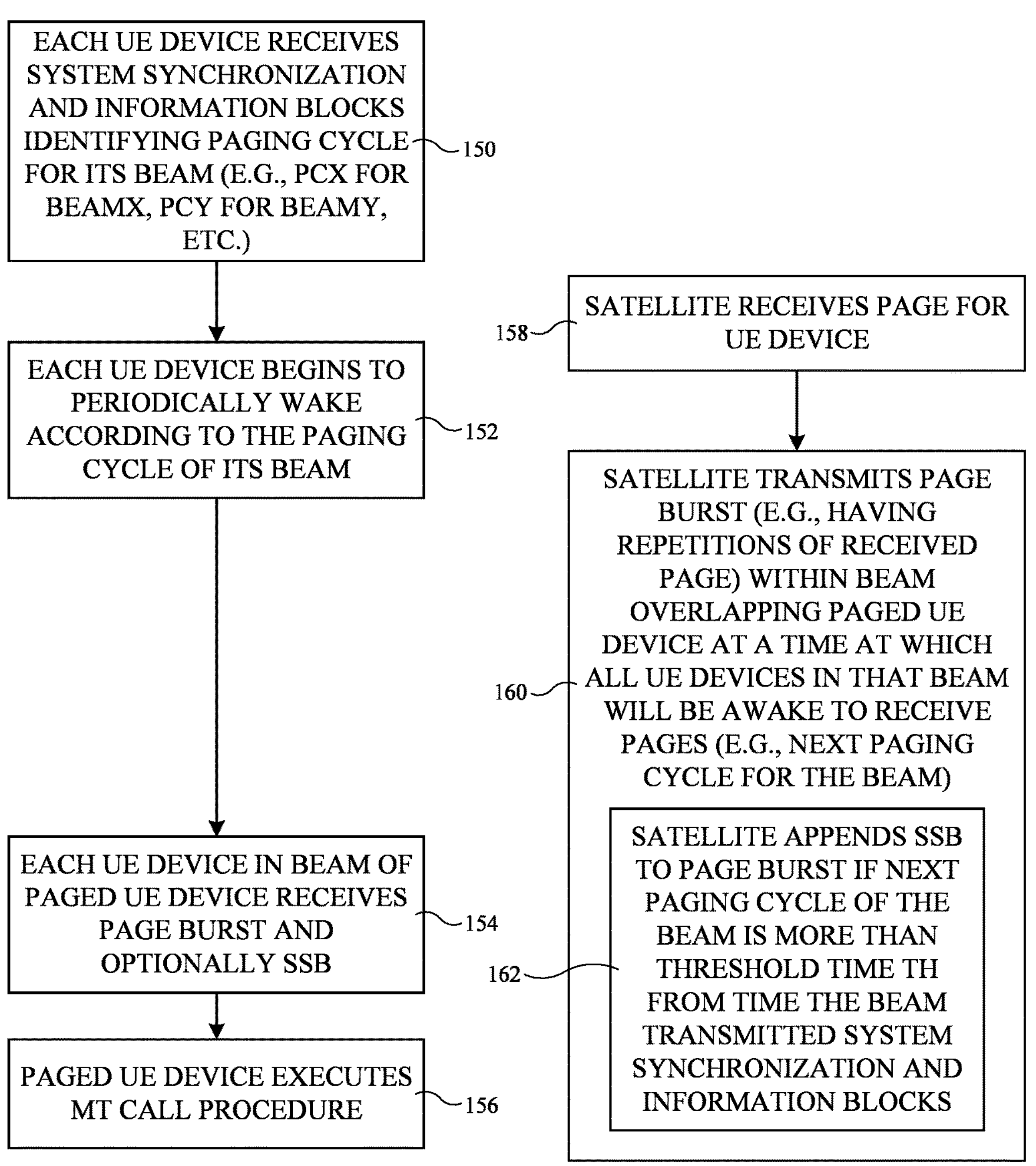
FIG. 9 is a flow chart of illustrative operations involved in using a communications satellite to provide MT services to user equipment devices in accordance with some embodiments.

FIG. 9 is a flow chart of operations that may be performed by connected mode UE devices 10 and a given satellite 12 to provide synchronized MT services to the connected mode UE devices. Operations 150-156 of FIG. 9 may be performed by the UE devices whereas operations 158-160 are performed by satellite 12.

At operation 150, each connected mode UE device 10 in the beam footprints of satellite 12 may begin to receive system synchronization and information blocks 72 (e.g., at operation 122 of FIG. 7). The information in system synchronization and information blocks 72 transmitted in each beam of satellite 12 (e.g., in system information block SIBA of FIG. 5) may identify the corresponding paging cycle PC for that beam (e.g., paging cycle PX for beam BEAMX of FIG. 8, paging cycle PY for beam BEAMY, etc.).

At operation 152, the connected mode UE devices 10 may begin to periodically wake to listen for paging signals according to the paging cycle PC for its beam (e.g., as identified by the system synchronization and information blocks 72 received at operation 150). The UE devices in beam BEAMX may periodically wake during wake-up periods 137 separated by paging cycle PCX of FIG. 8 whereas the UE devices in beam BEAMY may periodically wake during wake-up periods 146 separated by paging cycle PCY of FIG. 8, for example.

At operation 158, satellite 12 may receive a page for a given connected mode UE device (sometimes referred to herein as a paged UE device). Satellite 12 may transmit a paging signal 136 to the beam overlapping the paged UE device. The paging signal may include a burst of repetitions of the page 140 for the paged UE device (e.g., as shown in diagram 138 of FIG. 8). Satellite 12 may transmit the paging signal during the next wake-up period for the connected mode UE devices in the beam overlapping the paged UE device (e.g., at the beginning of the next paging cycle).

Satellite 12 may append an SSB to the beginning of the paging signal 136 transmitted over the beam overlapping the paged UE device (operation 162). Satellite 12 may, if desired, append the SSB to paging signal 136 when more than threshold time period TH will have elapsed between the time the paging signal 136 is transmitted and the time the last system synchronization and information blocks 72 were transmitted in the beam overlapping the paged UE device. When less than threshold time period TH will have elapsed between the time the paging signal 136 is transmitted and the time the last system synchronization and information blocks 72 were transmitted in the beam overlapping the paged UE device, satellite 12 may transmit paging signal 136 without the SSB.

If desired, satellite 12 may transmit paging signal 136 (e.g., with the appended SSB) over a set of multiple beams 66. The set of beams may include beams at or around the paged UE device. For example, when a UE device performs the registration procedure with CN 20 (e.g., at operation 122 of FIG. 7), CN 20 may assign a tracking area to the UE device. The tracking area may include one or more beams over which the UE device may roam without re-registering with CN 20 or performing a tracking area update. The set of beams may include each of the beams overlapping the tracking area if desired. This may help to ensure that the paged UE device receives the paging signal even if the UE device has physically moved since registering with CN 20.

At operation 154, each connected mode UE device 10 in the beam overlapping the paged UE device may receive paging signal 136 and optionally the SSB appended to paging signal 136. The paged UE device may use the SSB to correctly receive and decode at least one of the repetitions of page 140 in the paging signal 136 transmitted by satellite 12. The other connected mode UE devices in the beam overlapping the paged UE device may use the SSB to re-synchronize the timing resources of the UE devices to satellite 12 for subsequent MT, MO, and/or handover operations.

At operation 156, the paged UE device may execute an MT call procedure based on the received page 140. The MT call procedure may involve the exchange of information or wireless data between the paged UE device and CN 20 via satellite 12 and gateway(s) 14. The MT call procedure may be defined by the communications protocol governing communications between UE device 10 and satellite 12 and may, if desired, be based on the MT call procedure defined by 3GPP.

While UE devices 10 are in the connected mode, satellite 12 may provide MO services to the UE devices. A given UE device (sometimes referred to herein as a triggering UE device) may trigger MO service by starting a wireless service such as an outgoing voice or video call, transmission of a message or other data, etc. The triggering UE device may trigger the MO service by transmitting a PRACH message to satellite 12 (e.g., an MO service message MSG1 as defined by the 3GPP protocol).

Figure 10:
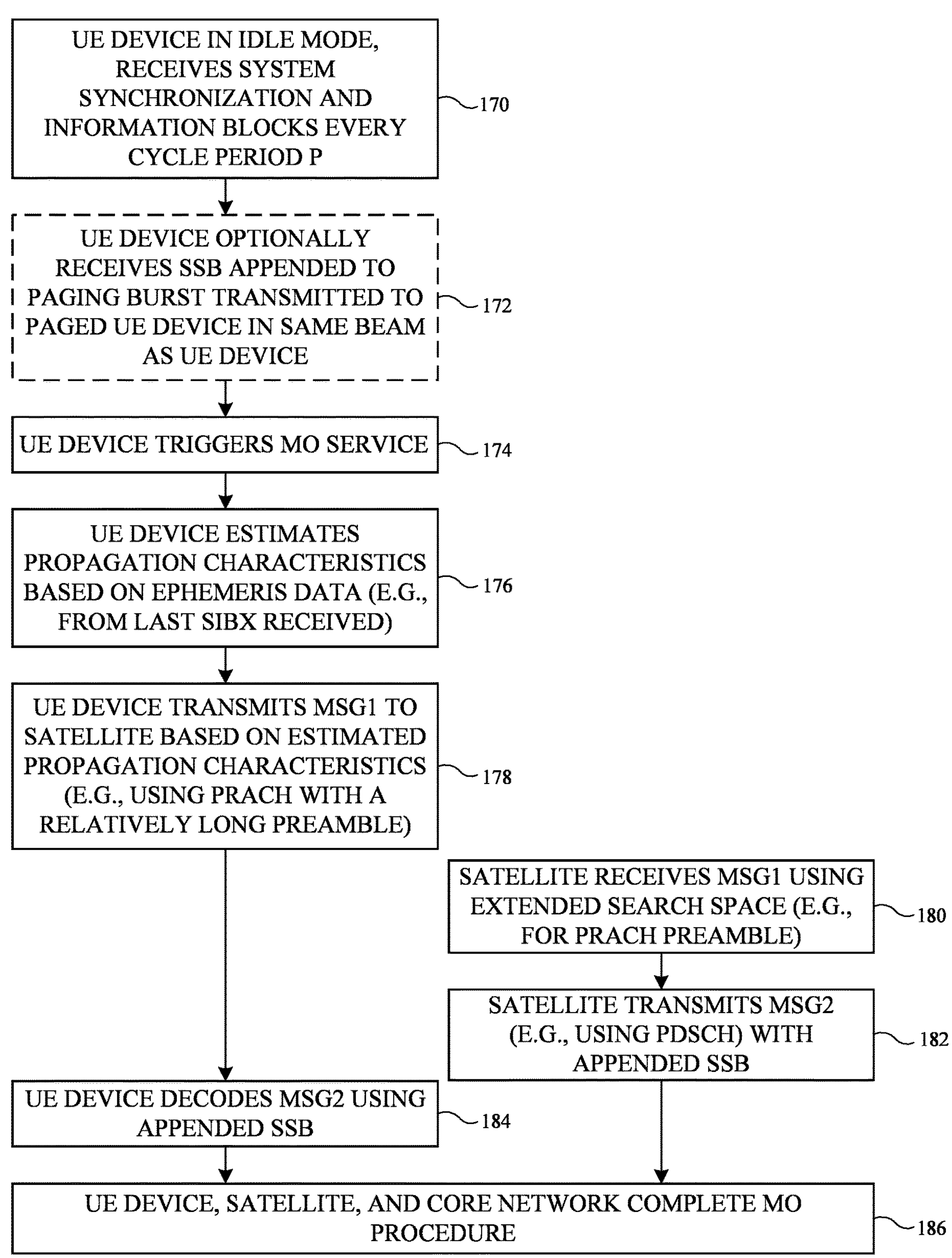
FIG. 10 is a flow chart of illustrative operations involved in using a communications satellite to provide mobile-originated (MO) services to user equipment devices in accordance with some embodiments.

FIG. 10 is a flow chart of operations that may be performed by a connected mode UE device 10 (e.g., a triggering UE device) and a given satellite 12 to provide synchronized MO services to the connected mode UE device. Operations 170-178, 184, and 186 of FIG. 9 may be performed by the triggering UE device whereas operations 180, 182, and 186 are performed by satellite 12.

At operation 170, UE device 10 may be in the idle mode. UE device 10 may begin to receive system synchronization and information blocks 72 from satellite 12 every SSB period P (e.g., at operation 122 of FIG. 7).

At operation 172, UE device 10 may optionally receive an SSB appended to a paging signal 136 transmitted to a UE device in the same beam footprint (e.g., at operation 154 of FIG. 9). The SSB appended to the paging signal may be received more recently than the last system synchronization and information blocks 72 received by UE device 10 (e.g., during the last SSB period P) and may therefore allow UE device 10 to be more currently synchronized to the timing of satellite 12.

At operation 174, UE device 10 may trigger MO service. UE device 10 may trigger MO service when an application running on UE device 10 has wireless data that it needs to transmit to CN 20 (e.g., an outgoing call).

At operation 176, UE device 10 may generate, calculate, compute, and/or estimate the radio-frequency propagation characteristics between UE device 10 and satellite 12 based on the ephemeris data stored on UE device 10 (e.g., for subsequent signal transmission to satellite 12). The system information block SIBX in the last received system synchronization and information blocks 72 may, for example, include updated ephemeris data for satellite 12. UE device 10 may, for example, generate, calculate, compute, and/or estimate a time offset and/or a frequency offset to use for subsequent signal transmission to satellite 12 (e.g., to ensure that the signals are received at the predicted position of satellite 12 at an expected time that is synchronized to the timing of satellite 12 and at the frequency used by satellite 12). The offsets may, for example, compensate for doppler shifts and/or relativistic effects associated with the subsequent propagation of the signals form UE device 10 to satellite 12.

At operation 178, UE device 10 may transmit a first message (e.g., MSG1) to satellite 12 (e.g., in uplink signals 24 of FIG. 1) based on the estimated propagation characteristics (e.g., using the frequency and time offsets estimated at operation 176). The first message may instruct satellite 12 and CN 20 to initiate MO services. Given the extended SSB period P used by satellite 12 to minimize power consumption, a relatively long amount of time may have passed between the time when UE device 10 needs to initiate MO services and receipt of the last SSB at UE device 10 (e.g., as long as 60 seconds or the duration of SSB period P), particularly when UE device 10 does not receive an SSB appended to a paging signal 136 (e.g., when operation 172 is not performed). This delay may cause the estimation of propagation characteristics (e.g., frequency and time offsets) at operation 176 to be less accurate than ideal, which may cause satellite 12 to miss the first message or to otherwise be unable to successfully receive or decode the first message.

To mitigate these issues, satellite 12 may implement an increased search space for the first message. For example, the first message may be a PRACH message. The PRACH message may have a corresponding PRACH preamble. UE device 10 may transmit the PRACH message with a relatively long PRACH preamble to help ensure that satellite 12 is able to successfully receive and decode the first message. Consider an example in which the PRACH preambles include PRACH preambles as defined by a 3GPP communications protocol. The PRACH preambles defined by the 3GPP communications protocol may have corresponding formats, each with a different length (e.g., formats 0, 1, 2, 3, A1, A2, A3, B1, B2, B3, B4, C0, or C2). Formats 0-3 may have longer lengths than the other formats and formats 1 and 2 may have the longest formats. UE device 10 may transmit the PRACH message having a PRACH preamble of the longest format(s) to maximize the chance that satellite 12 will be able to successfully receive and decode the first message (e.g., UE device 10 may transmit the PRACH message using a PRACH preamble of format 1 or 2).

At operation 180, the first message transmitted by UE device 10 may be incident upon satellite 12. Satellite 12 may search for the PRACH preamble of the first message over an extended (increased) search space (e.g., satellite 12 may search for a PRACH preamble of format 1 or 2 rather than for a shorter format preamble). This may help to ensure that satellite 12 is able to successfully receive and decode the PRACH preamble and the first message transmitted by UE device 10.

At operation 182, satellite 12 may transmit a second message (e.g., an MO service message MSG2 as defined by the 3GPP protocol) to UE device 10 in response to (based on) the received and decoded first message. Satellite 12 may, for example, transmit the second message as a PRACH response over the PDSCH. If desired, satellite 12 may append an SSB to the beginning of the second message. This may allow satellite 12 to update the timing synchronization of UE device 10 without further increasing the resource overhead of satellite 12.

At operation 184, UE device 10 may receive the second message transmitted by satellite 12 (e.g., UE device 10 may be active and listening for a PRACH response to its PRACH transmission). UE device 10 may, if desired, use the SSB appended to the second message to help ensure that UE device 10 is properly synchronized to satellite 12 (e.g., given the potentially long amount of time since reception of the last SSB at UE device 10). UE device 10 may, for example, use the SSB appended to the second message to successfully receive and decode the second message or to otherwise reduce the amount of time required for the UE device to successfully decode the second message.

At operation 186, UE device 10, satellite 12, gateway 14, and CN 20 may exchange additional signals to complete the MO procedure and to convey wireless data between UE device 10 and CN 20. This may allow satellite 12 to provide UE device 10 with MO services as quickly as possible despite the relatively long SSB period P implemented to minimize power consumption on satellite 12 (e.g., without requiring the UE device 10 to wait up to 60 seconds to begin an outgoing call).

Figure 11:
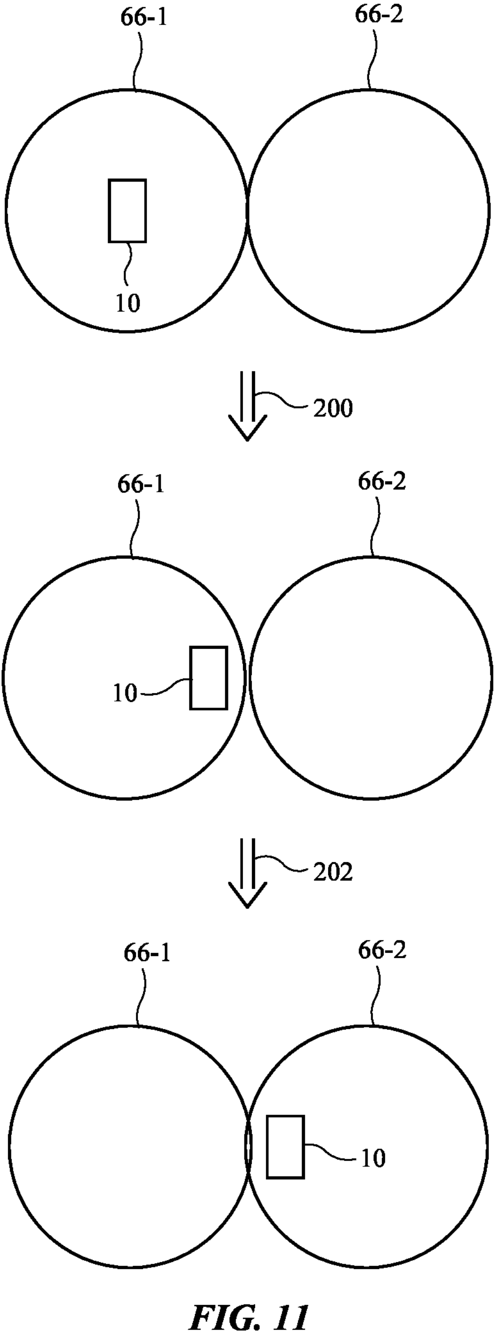
FIG. 11 is a diagram showing how different signal beams of one or more communications satellites may overlap a user equipment device over time in accordance with some embodiments.

In practice, different beams may overlap a given UE device 10 over time. FIG. 11 is a diagram showing one example of how different beams may overlap UE device 10 over time. As shown in FIG. 11, UE device 10 may be located within a first beam 66-1 of a given satellite 12 at a first time. There may be at least a second beam 66-2 adjacent to first beam 66-1. Second beam 66-2 may be a beam of the same satellite 12 or of a different satellite 12.

Over time, as shown by arrow 200, UE device 10 may move to a location near the edge of beam 66-1 (e.g., at or adjacent to the edge of beam 66-2). UE device 10 may then move to a location within beam 66-2 after more time has passed, as shown by arrow 202. UE device 10 may move within and between beams 66 in this way due to movement of UE device 10 on Earth and/or due to movement of satellite(s) 12 in space (since satellites 12 are NGSO satellites).

When UE device 10 is located within beam 66-1, beam 66-1 may be a serving beam for UE device 10 and may convey wireless data with UE device 10. When UE device 10 moves to beam 66-2, UE device 10 and satellite 12 may perform a handover operation to seamlessly transfer wireless services for UE device 10 from beam 66-1 to beam 66-2, such that beam 66-2 becomes the serving beam for UE device 10 (e.g., handover operations in which the serving beam is handed over from beam 66-1 to beam 66-2). Satellite 12 and UE device 10 may initiate or determine whether to perform the handover operation when UE device 10 is located within beam 66-1 near the edge of beams 66-1 and 66-2.

Given the relatively long SSB period P, UE device 10 may be out of timing and/or frequency synchronization with satellite 12 by the time UE device 10 needs to perform the handover operation from beam 66-1 to beam 66-2. If care is not taken, this may prevent UE device 10 from successfully continuing connected mode services with the network after the handover.

The 3GPP communications protocol defines the frequent transmission of reference signals from neighboring beams, which are measured by the UE device to determine when and how to perform handover. For example, if the UE device gathers wireless performance metric data from the reference signal transmitted in a neighboring beam to its current serving beam and the wireless performance metric data exceeds a threshold value, the network may initiate handover to the neighboring beam. However, this mechanism is very inefficient when the base stations are formed from NGSO satellites such as satellite 12 since the satellites may not have sufficient power to always transmit reference signals for neighboring beams.

To mitigate these issues and to ensure successful handover without requiring satellite(s) 12 to continuously transmit reference signals in neighboring beams to UE device 10, UE device 10 may receive and/or proactively request additional SSBs on-demand. For example, if UE device 10 determines that it is out of timing and frequency synchronization by more than a threshold amount or time (e.g., 60 seconds), UE device 10 may request an SSB for its serving beam and/or neighboring beams from satellite 12 for use in performing a successful handover. Satellite 12 may then transmit the SSB on-demand within the serving beam and/or the neighboring beams. If desired, satellite 12 may transmit the on-demand SSB(s) during a paging wake-up period (e.g., wake-up periods 137 or 146 of FIG. 8) so all connected mode UE devices in the beams used to transmit the on-demand SSB(s) receive the SSB(s) to keep their synchronization with satellite 12 current.

Figure 12:
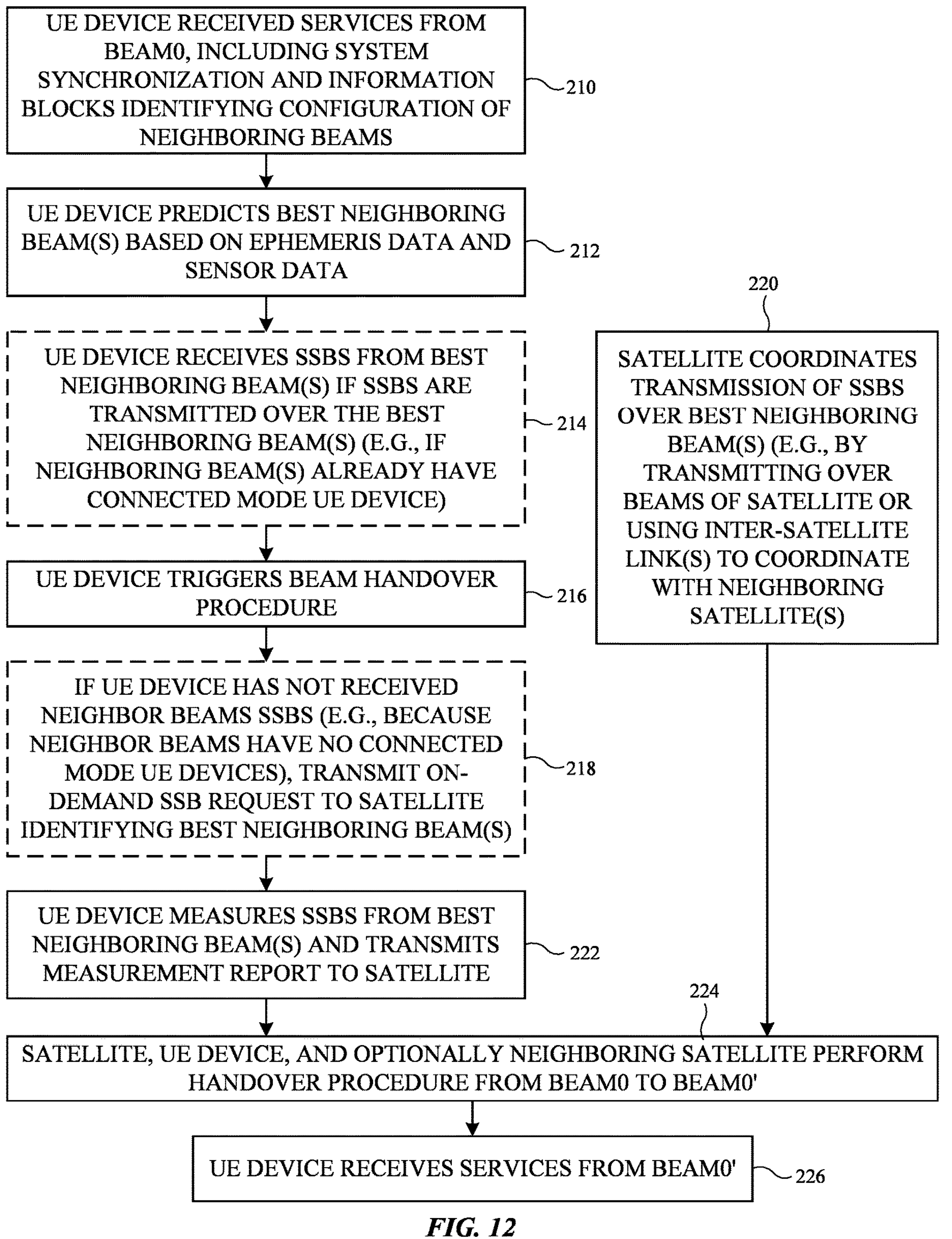
FIG. 12 is a flow chart of illustrative operations involved in performing a handover for a user equipment device from a first signal beam to a second signal beam of one or more communications satellites in accordance with some embodiments.

FIG. 12 is a flow chart of operations that may be performed by a connected mode UE device 10 and a given satellite 12 to perform handover for the UE device from a first beam (e.g., beam 66-1 of FIG. 11) to a second beam (e.g., beam 66-2 of FIG. 11). Operations 210-218, 222, 224, and 226 of FIG. 12 may be performed by the connected mode UE device whereas operations 220, 224, and 226 are performed by satellite 12.

At operation 210, UE device 10 may receive services from a first (serving) beam BEAM0 of satellite 12 overlapping the UE device (e.g., beam 66-1 of FIG. 11). UE device 10 may begin to receive system synchronization and information blocks 72 from satellite 12 every SSB period P (e.g., at operation 122 of FIG. 7). The system information block SIBX in system synchronization and information blocks 72 may include information identifying the configuration of a set of one or more neighboring beams to serving beam BEAM0. This information may include configuration parameters required for UE device 10 to synchronize to the neighboring beams at handover such as ephemeris data for satellite 12 or other satellite(s) having the neighboring beam(s), information identifying the paging cycle PC of the neighboring beam(s), the SSB offset between serving beam BEAM0 and the neighboring beam(s), etc.

At operation 212, UE device 10 may predict or select one or more best neighboring beam(s) from the neighboring beam(s) identified by system information block SIBX based on the ephemeris data stored on UE device 10 (e.g., as updated by system information block SIBX) and sensor data gathered by UE device 10. The sensor data may include satellite navigation information identifying a geographic location of UE device 10 (e.g., as gathered from GPS signals received at UE device 10), motion sensor data identify motion of UE device 10 (e.g., accelerometer data, gyroscope data, inertial measurement unit data, compass data, radar data, etc.), and/or any other desired sensor data indicative of the position and/or movement of UE device 10.

UE device 10 may, for example, select as the best neighboring beam(s) one or more beams from the neighboring beam(s) identified by system information block SIBX that UE device 10 estimates, based on the sensor data and/or the ephemeris data, are or will soon be at, near, overlapping, or adjacent to UE device 10. For example, UE device 10 may identify from system information block SIBX that UE device 10 is being served by beam 66-1 (FIG. 11), that beam 66-2 (FIG. 11) is one of the neighboring beams to beam 66-1, and/or the location of the beam footprint of beam 66-2. UE device 10 may use the sensor data to identify that UE device 10 is located near the edge of beam 66-1 (FIG. 11) and near the edge of beam 66-2. UE device 10 may also use the sensor data to determine that UE device 10 is moving in the direction of beam 66-2 and/or may use the ephemeris data to determine that the satellite(s) 12 having beams 66-1 and 66-2 is/are moving such that beam 66-2 will soon overlap the location of device 10. UE device 10 may therefore select beam 66-2 as the best neighboring beam. In general, UE device 10 may select any desired number of beams to form a set of best neighboring beams (e.g., a subset of the set of neighboring beams identified by SIBX). If desired, UE device 10 may rank the best neighboring beams in the set in order of decreasing priority.

At operation 214, UE device 10 may optionally receive SSBs from the best neighboring beam(s). UE device 10 may have knowledge of the SSB offset between serving beam BEAM0 and the best neighboring beam(s) (e.g., from the system information block SIBX received at operation 170), which may allow UE device 10 to successfully receive and decode the SSBs from the best neighboring beam(s). UE device 10 may receive SSBs from the best neighboring beam(s) when satellite(s) 12 happen to transmit SSBs over the best neighboring beam(s), such as in system synchronization and information blocks 72 transmitted every SSB period P, SSBs appended to paging signals 136 for receipt by connected mode UE devices in the best neighboring beam(s) (e.g., as shown in FIG. 8), and/or SSBs appended to the second message transmitted to connected mode UE device(s) in the best neighboring beam(s) that are requesting MO service (e.g., as transmitted at operation 182 of FIG. 10), as examples. In situations where there are no connected mode UE devices in the best neighboring beam(s) and it has been a relatively long amount of time since the last transmission of system synchronization and information blocks 72 in the best neighboring beam(s) (e.g., up to 60 seconds), UE device 10 may not receive any SSBs from the best neighboring beam(s) at operation 214.

At operation 216, UE device 10 may trigger a beam handover procedure. This may occur when the received power of signals received at UE device 10 falls below a threshold value, when other wireless performance metric data gathered by UE device 10 from received radio-frequency signals falls below a threshold value, and/or when UE device 10 predicts that the best neighboring beam(s) will exhibit superior wireless performance than the current serving beam BEAM0.

At optional operation 218, if UE device 10 has not yet received any SSBs from the best neighboring beam(s) (e.g., because there are no connected mode UE devices in the best neighboring beam(s)), UE device 10 may transmit a request for an on-demand SSB to satellite 12 (sometimes referred to herein as an on-demand SSB request). The request may include a message identifying the selected best neighboring beam(s).

At operation 220, satellite 12 may coordinate new transmission of SSBs over the neighboring beams to the serving beam BEAM0 (e.g., the neighboring beams identified in the system information block SIBX transmitted over serving beam BEAM0 at operation 210). When the neighboring beams are all beams of satellite 12, satellite 12 may transmit one or more SSBs over each of the neighboring beams. When the neighboring beams include beams of other satellites, satellite 12 may transmit signals to the other satellites (e.g., over inter-satellite links) that instruct those satellites to transmit one or more SSBs over each of the neighboring beams.

When operation 218 is performed, satellite 12 may receive the on-demand SSB request from UE device 10. In these situations, when the best neighboring beam(s) belong to satellite 12, satellite 12 may transmit one or more SSBs over the best neighboring beam(s). When the best neighboring beam(s) belong to other satellites, satellite 12 may transmit signals to the other satellites (e.g., over inter-satellite links) that instruct those satellites to transmit one or more SSBs over the best neighboring beam(s).

At operation 222, UE device 10 may receive the SSBs transmitted over the best neighboring beam(s). UE device 10 may gather measurements of the SSBs such as wireless performance metric data. The wireless performance metric data may include SNR values, received power levels, RSRP values, error rate values, and/or any to the desired wireless performance metric information associated with reception of the SSBs at UE device 10. UE device 10 may generate a measurement report that includes the measurements of the SSBs (e.g., that includes the wireless performance metric data). UE device 10 may transmit the measurement report to satellite 12 (e.g., an L1-RSRP measurement report) to inform satellite 12 and the rest of the network of how well UE device 10 received the SSBs over the best neighboring beam(s). The network may use this information to determine if and when to perform a handover of UE device 10 from serving beam BEAM0 to a new serving beam BEAM0' (e.g., the best performing of the best neighboring beam(s)).

At operation 224, UE device 10, satellite 12, and optionally another satellite (e.g., when the new serving beam is a beam of another satellite) may perform a handover procedure from serving beam BEAM0 to the new serving beam BEAM0'. Serving beam BEAM0' may be a beam of the same satellite as beam BEAM0 (e.g., the handover may be an intra-cell handover between beams of the same satellite base station) or of a different satellite (e.g., the handover may be an inter-cell handover between beams of different satellite base stations). The handover procedure may be, for example, a 3GPP-based beam-switching procedure.

At operation 226, UE device 10 may receive communication services over serving beam BEAM0'.

Figure 13:
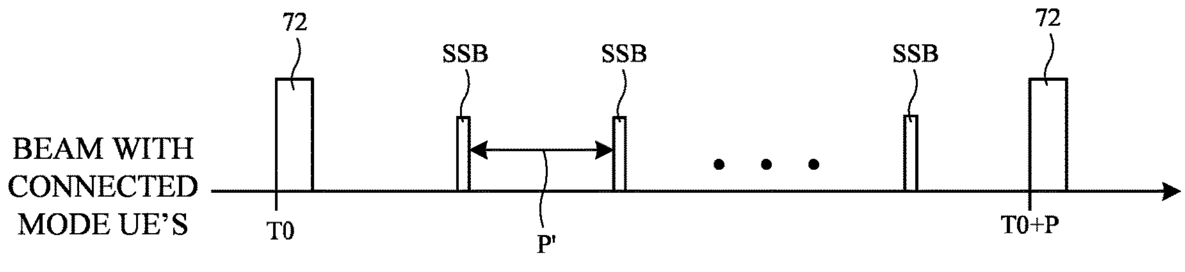
FIG. 13 is a timing diagram showing how an illustrative communications satellite may periodically transmit system synchronization blocks in a signal beam overlapping user equipment devices in a connected mode in accordance with some embodiments.

If desired, satellite 12 may periodically transmit additional SSBs outside of system synchronization and information blocks 72 for beams having connected mode UE devices 10. FIG. 13 is a timing diagram showing how satellite 12 may periodically transmit additional SSBs outside of system synchronization and information blocks 72 for a beam having connected mode UE devices.

As shown in FIG. 13, which plots time on the horizontal axis, satellite 12 may periodically transmit system synchronization and information blocks 72 within a given beam 66 every SSB period P (e.g., at initial time T0, then at time T0+P, then at time T0+2P, etc.). When there are connected mode UE devices within the beam, satellite 12 may also periodically transmit individual SSBs with a shortened SSB period P'. Shortened SSB period P' may be, for example, 40 ms, 80 ms, 160 ms, or other durations.

Unlike system synchronization and information blocks 72, which include a burst of N repetitions of the SSB (e.g., as shown in FIG. 5), the SSBs transmitted every shortened SSB period P' may include only a single copy of the SSB (or any other desired reference signal (RS)). In addition, while system synchronization and information blocks 72 include system information blocks SIBA and SIBX, the SSBs transmitted every shortened SSB period P' may be transmitted without any system information blocks.

The individual SSBs transmitted every shortened SSB period P' may help the connected mode UE devices to remain synchronized with satellite 12 without having to wait for the next SSB period P to begin. This may allow the UE devices to perform MT services, MO services, and/or handover using a recently-received SSB, thereby helping to ensure the UE devices are tightly synchronized to satellite 12 while transmitting or receiving signals. Since connected mode UE devices are likely not located in a user's pocket or purse, the SSB need not be transmitted in bursts of repetitions every shortened SSB period P'. However, satellite 12 may continue transmitting system synchronization and information blocks 72 every SSB period P to help unconnected UE devices to enter connected mode and to help any connected mode devices that are located in a user's pocket or purse or that are located indoors, under foliage, or with intervening objects between the UE devices and satellite 12 to receive an SSB at least every SSB period P.

If desired, satellite 12 may provide different beams 66 with dynamic SSB periodicities. For example, satellite 12 may configure different beams 66 to exhibit different SSB periods P and/or may change duration of the SSB period P of one or more beams 66 over time. In some implementations, satellite 12 may select the duration of SSB period P for each beam 66 based on the number of UE devices available in each beam (e.g., the number of connected UE devices in each beam).

Figure 14:
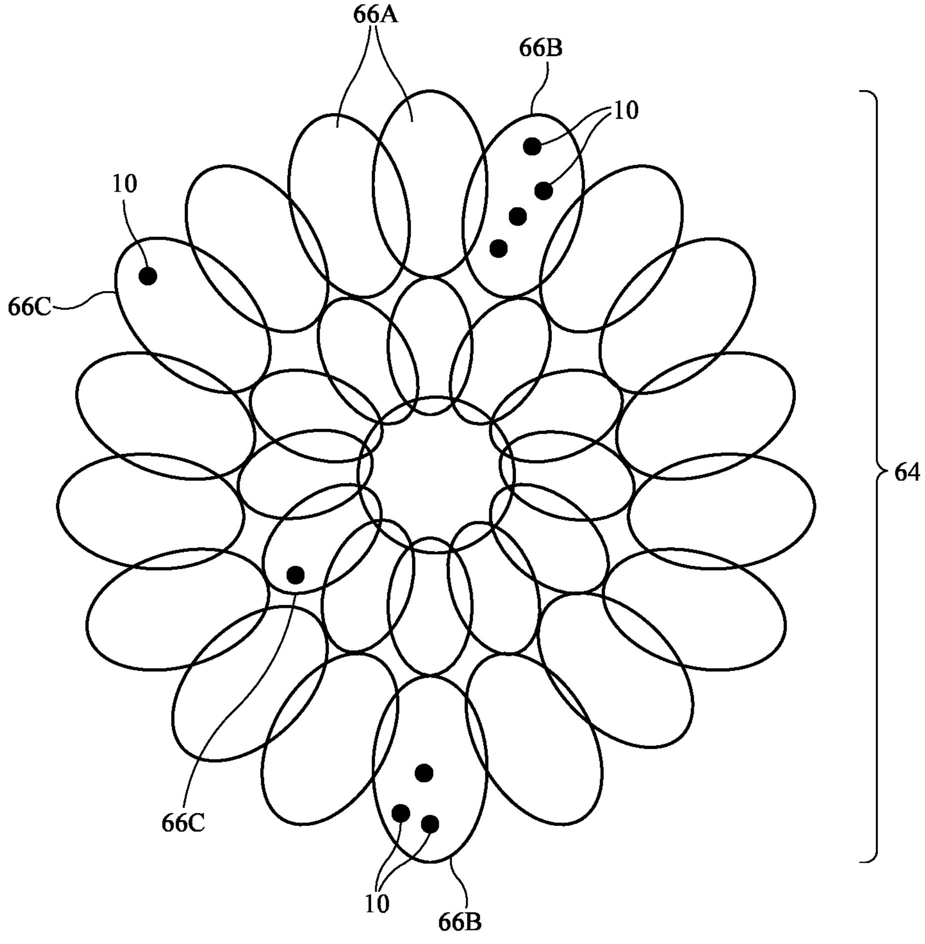
FIG. 14 is a diagram showing how an illustrative communications satellite may communicate with different numbers of user equipment devices in different signal beams in accordance with some embodiments.

FIG. 14 is a diagram showing one example of how different numbers of UE devices 10 may be located within different beams 66 of satellite 12. As shown in FIG. 14, some beams 66 in region 64 such as beams 66A may include no UE devices 10 (e.g., no connected mode or idle mode UE devices). Other beams in region 64 such as beams 66C may include a relatively small number of UE devices 10 (e.g., connected mode or idle UE devices). Other beams 66 such as beams 66B may include a relatively large number of available UE devices 10 (e.g., connected mode or idle devices).

Satellite 12 may assign, select, or generate different SSB periodicities for different beams 66 based on the number of available UE devices contained therein. For example, satellite 12 may assign a first SSB period to beams 66A, a second SSB period to beams 66B, and a third SSB period to beams 66C. Satellite 12 may assign an SSB period to a given beam 66 based on the number of available UE devices (e.g., idle or connected mode UE devices) in that beam. Satellite 12 may, for example, assign longer SSB periods (slower SSB periodicities) to beams 66 having fewer UE devices than beams 66 having more UE devices. In the example of FIG. 14, satellite 12 may therefore assign a first SSB period P to beams 66A, a second SSB period P to beams 66C that is shorter than the first SSB period P, and a third SSB period P to beams 66B that is shorter than the second SSB period P. In general, satellite 12 may assign any different number of SSB periods across its beams 66.

Satellite 12 may still transmit system synchronization and information blocks 72 within empty beams such as beams 66C (e.g., with the first SSB period P). This may allow any unconnected UE devices that enter or become available for communication with satellite 12 to receive system synchronization and information blocks 72 to register to the network (e.g., to connect to the network at operation 122 of FIG. 7). The SSB period P for these beams may be relatively long (e.g., on the order of minutes). In beams where connected mode UE devices are present (e.g., beams 66B and 66C), the SSB transmission period may be more frequent (e.g., on the order of several seconds for beams with relatively few UE devices such as beams 66C to on the order of several ms for beams with a large number of UE devices such as beams 66B).

Figure 15:
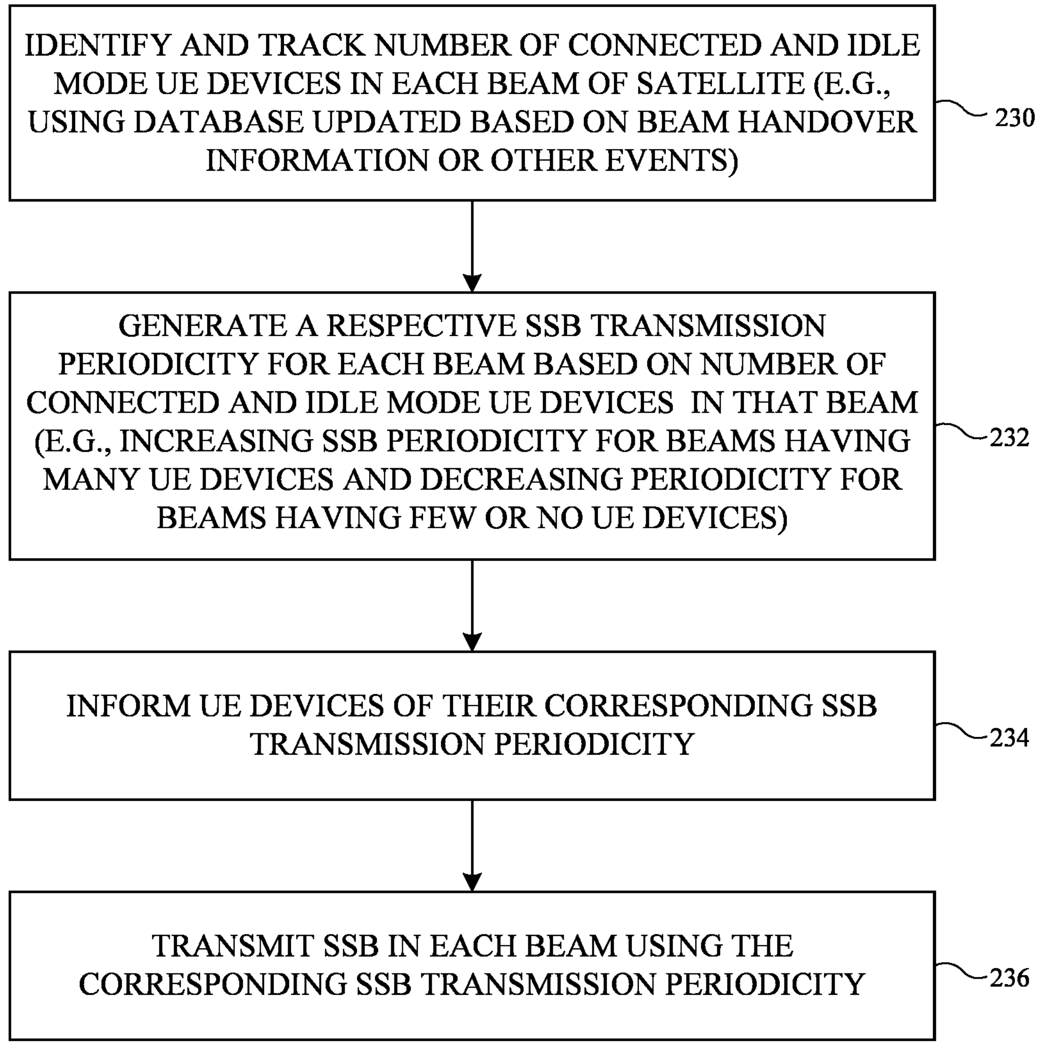
FIG. 15 is a flow chart of illustrative operations that may be performed by a communications satellite to transmit system synchronization blocks in different signal beams with dynamic periodicities selected based on the number of user equipment devices in the signal beams in accordance with some embodiments.

FIG. 15 is a flow chart of illustrative operations that may be performed by satellite 12 to transmit system synchronization and information blocks 72 with different SSB periods P in different beams 66 that are selected based on the number of UE devices in each beam.

At operation 230, satellite 12 may begin to identify and track the number of connected mode and idle mode UE devices in each beam 66. If desired, satellite 12 (or CN 20) may maintain a database containing information about the presence of UE devices 10 in different locations on Earth (e.g., locations overlapping different beam footprints of satellite 12). Satellite 12 and/or CN 20 may periodically update the database based on beam handover information and other events.

At operation 232, satellite 12 may generate a respective SSB transmission period P for each beam 66 based on the number of connected and idle mode UE devices 10 located within each beam 66. For example, satellite 12 may decrease the SSB period P (e.g., increasing, speeding up, or accelerating the SSB periodicity or frequency) for beams 66 having more connected and idle mode UE devices 10 and may increase the SSB period P (e.g., decreasing, slowing, or decelerating the SSB periodicity or frequency) for beams 66 having fewer connected and idle mode UE devices 10. Dynamically allocating SSB period P across beams 66 in this way may allow the UE devices to synchronize with satellite 12 in time and frequency to successfully perform subsequent communications procedures. While powered on UE devices that are not in connected mode may have to wait longer to synchronize to the network (e.g., due to the longer SSB period P for empty cells 66), time and frequency synchronization may be less critical for these UE devices than for connected mode UE devices 10, which may already be transmitting and/or receiving wireless data such that any disruptions would be more noticeable to the user.

At operation 234, satellite 12 and/or CN 20 may inform UE devices 10 of their corresponding SSB periods P. In some implementations, an application server (e.g., a content data network) may configure UE devices 10 with the corresponding SSB period P based on geographical boundaries of the footprints of beams 66. However, this approach results in a fixed SSB period P based on geographical area. This approach does not make the allocation of SSB period P dynamic as new UE devices are added or removed from a given beam footprint.

To mitigate these issues, satellite 12 may broadcast information identifying the SSB period P to use for each beam 66 in one of the system information blocks SIBA or SIBX of the system synchronization and information blocks 72 transmitted over each beam (e.g., at operations 96 or 98 of FIG. 6). This may allow the UE devices in each beam 66 to receive the corresponding SSB period P for its beam 66 dynamically whenever system synchronization and information blocks 72 are transmitted. If desired, satellite 12 may implement a learned behavior model of SSB period based on location and time. The learned behavior model may be pushed to UE devices 10 (e.g., in synchronization and information blocks 72). This approach may not require dynamic radio resources at every configuration, and the parameter values of the model may be updated over time to adapt to more realistic UE device behaviors.

At operation 236, satellite 12 may transmit SSBs (e.g., in synchronization and information blocks 72) in each beam 66 using the corresponding SSB period P selected for that beam.

One or more elements described herein (e.g., UE devices 10, satellite 12, gateway 14, CN 20, etc.) may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth herein. For example, the control circuitry as described above in connection with one or more of the preceding figures may be configured to operate in accordance with one or more of the examples set forth herein. For another example, circuitry associated with a UE, satellite, gateway, core network, base station, network element, etc. as described above in connection with one or more of the preceding figures may be configured to operate in accordance with one or more of the examples set forth herein.

In the following sections, further exemplary aspects are provided.

Example 1 includes a method of operating a communications satellite to perform wireless communications with user equipment (UE) devices, the method comprising: periodically transmitting, with a first transmission period, a first burst of repetitions of a system synchronization block (SSB), the first burst being transmitted in a first signal beam; and periodically transmitting, with a second transmission period, a second burst of repetitions of the SSB, the second burst being transmitted in a second signal beam oriented at a different angle than the first signal beam.

Example 2 includes the method of example 1 or some other example or combination of examples herein, wherein the second transmission period is offset in time from the first transmission period.

Example 3 includes the method of any one of examples 1 or 2 or some other example or combination of examples herein, wherein the second transmission period and the first transmission period have equal durations.

Example 4 includes the method of any one of examples 1-3 or some other example or combination of examples herein, wherein the first transmission period has a first duration, the second transmission period has a second duration that is less than the first duration, and there are more UE devices overlapping the second signal beam than the first signal beam.

Example 5 includes the method of any one of examples 1~4 or some other example or combination of examples herein, wherein the first transmission period and the second transmission period have durations greater than 1 second.

Example 6 includes the method of any one of examples 1-5 or some other example or combination of examples herein, further comprising: subsequent to transmission of the first burst of repetitions of the SSB, periodically transmitting, in the first signal beam and with the first transmission period, a first burst of repetitions of a first system information block (SIB); and subsequent to transmission of the second burst of repetitions of the SSB, periodically transmitting, in the second signal beam and with the second transmission period, a second burst of repetitions of the first SIB.

Example 7 includes the method of any one of examples 1-6 or some other example or combination of examples herein, further comprising: subsequent to transmission of the first burst of repetitions of the first SIB, periodically transmitting, in the first signal beam and with the first transmission period, a burst of repetitions of a second SIB that is different from the first SIB; and subsequent to transmission of the second burst of repetitions of the SIB, periodically transmitting, in the second signal beam and with the second transmission period, a burst of repetitions of a third SIB that is different from the first SIB and the second SIB.

Example 8 includes the method of any one of examples 1-7 or some other example or combination of examples herein, wherein the first transmission period comprises a first silent period after transmission of the burst of repetitions of the second SIB and the second transmission period comprises a second silent period after transmission of the burst of repetitions of the third SIB.

Example 9 includes the method of any one of examples 1-8 or some other example or combination of examples herein, wherein the second SIB and the third SIB comprise ephemeris data associated with the communications satellite.

Example 10 includes the method of any one of examples 1-9 or some other example or combination of examples herein, wherein the second SIB comprises information identifying the first signal beam and the second SIB comprises information identifying the second signal beam.

Example 11 includes the method of any one of examples 1-10 or some other example or combination of examples herein, wherein the second SIB comprises information identifying a third signal beam of the communications satellite adjacent to the first signal beam.

Example 12 includes the method of any one of examples 1-11 or some other example or combination of examples herein, wherein the second SIB comprises information identifying a paging cycle of the third signal beam.

Example 13 includes the method of any one of examples 1-12 or some other example or combination of examples herein, further comprising: when the first signal beam overlaps a UE device in a connected mode, periodically transmitting the SSB with a third transmission period less than the second transmission period.

Example 14 includes a method of operating a communications satellite to perform wireless communications with user equipment (UE) devices, the method comprising:

transmitting, in a signal beam, a system information block (SIB) that identifies a paging cycle for the signal beam; transmitting, during a UE device wake-up period associated with the paging cycle, a paging signal in the signal beam; and transmitting, in the signal beam, a system synchronization block (SSB) appended to the paging signal.

Example 15 includes the method of example 14 or some other example or combination of examples herein, further comprising: receiving, from a gateway, a paging message, wherein the paging signal comprises repetitions of the paging message.

Example 16 includes the method of any one of examples 14 or 15 or some other example or combination of examples herein, further comprising: transmitting, in an additional signal beam oriented in a different direction than the signal beam, an additional SIB that identifies an additional paging cycle for the additional signal beam, the additional paging cycle being different from the paging cycle.

Example 17 includes the method of any one of examples 14-16 or some other example or combination of examples herein, further comprising: transmitting, during an additional UE device wake-up period associated with the additional paging cycle, an additional paging signal in the additional signal beam; and transmitting, in the signal beam, the SSB appended to the additional paging signal.

Example 18 includes the method of any one of examples 14-17 or some other example or combination of examples herein, wherein transmitting the SSB appended to the paging signal comprises transmitting the SSB appended to the paging signal when a duration between the UE device wake-up period and a previous transmission of the SSB in the signal beam exceeds a threshold duration, the method further comprising: when the duration is less than the threshold duration, transmitting the paging signal without the SSB appended to the paging signal.

Example 19 includes a method of operating a communications satellite to perform wireless communications with user equipment (UE) devices, the method comprising: receiving, from a UE device overlapping a signal beam, a message requesting mobile-originated (MO) communication services; transmitting, in the signal beam, a response to the message; and transmitting, in the signal beam, a system synchronization block (SSB) appended to the response.

Example 20 includes the method of example 19 or some other example or combination of examples herein, wherein the response comprises a physical random access channel (PRACH) response.

Example 21 includes a method of operating a user equipment (UE) device to perform wireless communications with a satellite, the method comprising: transmitting, to the satellite, a message requesting mobile-originated (MO) communication services from the satellite; and receiving, from the satellite, a response to the message and a system synchronization block (SSB) appended to a beginning of the response.

Example 22 includes the method of example 21 or some other example or combination of examples herein, further comprising: decoding the response using the SSB appended to the beginning of the response.

Example 23 includes the method of any one of examples 21 or 22 or some other example or combination of examples herein, wherein the message comprises a physical random access channel (PRACH) message having a PRACH preamble and wherein the response comprises a PRACH response.

Example 24 includes the method of any one of examples 21-23 or some other example or combination of examples herein, wherein the PRACH preamble comprises a 3GPP PRACH preamble of format 1 or format 2.

Example 25 includes the method of any one of examples 21-24 or some other example or combination of examples herein, further comprising: receiving, from the satellite, a system information block (SIB) comprising ephemeris data associated with the satellite, wherein transmitting the message comprises transmitting the message using a time offset based on the ephemeris data.

Example 26 includes a method of operating a user equipment (UE) device to perform wireless communications with a satellite, the method comprising: receiving, over a first signal beam of the satellite, a system information block (SIB), wherein the SIB identifies a second signal beam different from the first signal beam; and transmitting, to the satellite, a request for a system synchronization block (SSB) to be transmitted over the second signal beam.

Example 27 includes the method of example 26 or some other example or combination of examples herein, further comprising: receiving the SSB over the second signal beam.

Example 28 includes the method of any one of examples 26 or 27 or some other example or combination of examples herein, further comprising: performing, based on the SSB received over the second signal beam, a handover procedure with the satellite, wherein the handover procedure changes a serving beam for the UE device from the first signal beam to the second signal beam.

Example 29 includes the method of any one of examples 26-28 or some other example or combination of examples herein, wherein the second signal beam is formed by the satellite and receiving the SSB comprises receiving the SSB from the satellite.

Example 30 includes the method of any one of examples 26-29 or some other example or combination of examples herein, wherein the second signal beam is formed by an additional satellite and receiving the SSB comprises receiving the SSB from the additional satellite.

Example 31 includes the method of any one of examples 26-30 or some other example or combination of examples herein, further comprising: generating wireless performance metric data based on the received SSB; and transmitting, to the satellite, a measurement report that includes the wireless performance metric data.

Example 32 includes the method of any one of examples 26-31 or some other example or combination of examples herein, further comprising: after transmission of the measurement report, performing a handover procedure with the satellite from the first signal beam to the second signal beam.

Example 33 includes the method of any one of examples 26-32 or some other example or combination of examples herein, wherein the SIB comprises information identifying a first paging cycle of the first signal beam and a second paging cycle of the second signal beam and wherein receiving the SSB comprises receiving the SSB during a UE wake-up period associated with the second paging cycle.

Example 34 includes the method of any one of examples 26-33 or some other example or combination of examples herein, wherein the SIB identifies a set of signal beams that includes the second signal beam, the method further comprising: generating sensor data indicative of a location of the UE device; and identifying, based on the sensor data, the second signal beam from the set of signal beams for transmission of the request.

Example 35 includes the method of any one of examples 26-34 or some other example or combination of examples herein, wherein the SIB identifies a third signal beam different from the first and second signal beams, the method further comprising: receiving an additional SSB from the third signal beam prior to transmitting the request.

Example 36 includes the method of any one of examples 26-35 or some other example or combination of examples herein, further comprising: receiving, over the first signal beam, an additional SSB appended to the SIB, wherein transmitting the request comprises transmitting the request using a timing that is synchronized to the satellite based on the additional SSB.

Example 37 includes a method of operating a communications satellite to perform wireless communications with user equipment (UE) devices, the method comprising: selecting a system synchronization block (SSB) periodicity for a signal beam based on a number of UE devices overlapping the signal beam; and transmitting, over the signal beam, SSBs with the selected SSB periodicity.

Example 38 includes the method of example 37 or some other example or combination of examples herein, further comprising: transmitting, over the signal beam, a system information block (SIB) that identifies the selected SSB periodicity.

Example 39 includes the method of any one of examples 37 or 38 or some other example or combination of examples herein, further comprising: speeding up the SSB periodicity in response to an increase in the number of UE devices overlapping the signal beam.

Example 40 includes the method of any one of examples 37-39 or some other example or combination of examples herein, further comprising: slowing the SSB periodicity in response to a decrease in the number of UE devices overlapping the signal beam.

An apparatus (e.g., an electronic user equipment device, a wireless base station, etc.) may be provided that includes means to perform one or more elements of a method described in or related to any of the methods or processes described herein.

One or more non-transitory computer-readable media comprising instructions to cause an electronic device, upon execution of the instructions by one or more processors of the electronic device, to perform one or more elements of any method or process described herein.

An apparatus comprising logic, modules, or circuitry to perform one or more elements of a method described in or related to any of the method or process described herein.

An apparatus comprising: one or more processors and one or more non-transitory computer-readable storage media comprising instructions that, when executed by the one or more processors, cause the one or more processors to perform the method, techniques, or process as described herein.

A signal, datagram, information element, packet, frame, segment, PDU, or message or datagram may be provided as described in or related to any of the examples described herein.

A signal encoded with data, a datagram, IE, packet, frame, segment, PDU, or message may be provided as described in or related to any of the examples described herein.

An electromagnetic signal may be provided carrying computer-readable instructions, wherein execution of the computer-readable instructions by one or more processors is to cause the one or more processors to perform the method, techniques, or process as described in or related to any of the examples described herein.

A computer program comprising instructions, wherein execution of the program by a processing element is to cause the processing element to carry out the method, techniques, or process as described in or related to any of the examples described herein.

A signal in a wireless network as shown and described herein may be provided.

A method of communicating in a wireless network as shown and described herein may be provided.

A system for providing wireless communication as shown and described herein may be provided.

A device for providing wireless communication as shown and described herein may be provided.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A method of operating a communications satellite to perform wireless communications with user equipment (UE) devices, the method comprising:

periodically transmitting, with a first transmission period, a first burst of repetitions of a system synchronization block (SSB), the first burst being transmitted in a first signal beam;

subsequent to transmission of the first burst of repetitions of the SSB, periodically transmitting, in the first signal beam and with the first transmission period, a first burst of repetitions of a first system information block (SIB); and periodically transmitting, with a second transmission period, a second burst of repetitions of the SSB, the second burst being transmitted in a second signal beam oriented at a different angle than the first signal beam.

2. The method of claim 1, wherein the second transmission period is offset in time from the first transmission period.

3. The method of claim 2, wherein the second transmission period and the first transmission period have equal durations.

4. The method of claim 2, wherein the first transmission period has a first duration, the second transmission period has a second duration that is less than the first duration, and there are more UE devices overlapping the second signal beam than the first signal beam.

5. The method of claim 1, wherein the first transmission period and the second transmission period have durations greater than 1 second.

6. The method of claim 1, further comprising:

subsequent to transmission of the second burst of repetitions of the SSB, periodically transmitting, in the second signal beam and with the second transmission period, a second burst of repetitions of the first SIB.

7. The method of claim 6, further comprising:

subsequent to transmission of the first burst of repetitions of the first SIB, periodically transmitting, in the first signal beam and with the first transmission period, a burst of repetitions of a second SIB that is different from the first SIB; and subsequent to transmission of the second burst of repetitions of the SIB, periodically transmitting, in the second signal beam and with the second transmission period, a burst of repetitions of a third SIB that is different from the first SIB and the second SIB.

8. The method of claim 7, wherein the first transmission period comprises a first silent period after transmission of the burst of repetitions of the second SIB and the second transmission period comprises a second silent period after transmission of the burst of repetitions of the third SIB.

9. The method of claim 7, wherein the second SIB and the third SIB comprise ephemeris data associated with the communications satellite.

10. The method of claim 7, wherein the second SIB comprises information identifying the first signal beam and the second SIB comprises information identifying the second signal beam.

11. The method of claim 10, wherein the second SIB comprises information identifying a third signal beam of the communications satellite adjacent to the first signal beam, wherein the second SIB comprises information identifying a paging cycle of the third signal beam.

12. The method of claim 1, further comprising:

when the first signal beam overlaps a UE device in a connected mode, periodically transmitting the SSB with a third transmission period less than the second transmission period.

13. The method of claim 1, further comprising:

transmitting a system information block (SIB) that identifies a paging cycle for a given signal beam;

transmitting, during a user equipment (UE) device wake-up period associated with the paging cycle, a paging signal in the given signal beam; and transmitting, in the given signal beam, the SSB appended to the paging signal.

14. The method of claim 13, further comprising:

receiving, from a gateway, a paging message, wherein the paging signal comprises repetitions of the paging message.

15. The method of claim 13, wherein transmitting the SSB appended to the paging signal comprises transmitting the SSB appended to the paging signal when a duration between the UE device wake-up period and a previous transmission of the SSB in the given signal beam exceeds a threshold duration, the method further comprising:

when the duration is less than the threshold duration, transmitting the paging signal without the SSB appended to the paging signal.

16. The method of claim 1, further comprising:

receiving, from a user equipment (UE) device overlapping a given signal beam, a message requesting mobile-originated (MO) communication services;

transmitting, in the given signal beam, a response to the message; and transmitting, in the given signal beam, a system synchronization block (SSB) appended to the response.

17. A method of operating a communications system, the method comprising:

periodically transmitting, via a first signal beam of a communications satellite, a first burst of repetitions of a system synchronization block (SSB) using a first transmission period; and periodically transmitting, via a second signal beam of the communications satellite, a second burst of repetitions of the SSB using a second transmission period that is different than the first transmission period, wherein the first transmission period and the second transmission period have durations greater than 1 second.

18. The method of claim 17, further comprising:

subsequent to transmission of the first burst of repetitions of the SSB, periodically transmitting, in the first signal beam and with the first transmission period, a first burst of repetitions of a first system information block (SIB); and subsequent to transmission of the second burst of repetitions of the SSB, periodically transmitting, in the second signal beam and with the second transmission period, a second burst of repetitions of the first SIB.

19. A method of operating a communications satellite to perform wireless communications with user equipment (UE) devices, the method comprising:

periodically transmitting, with a first transmission period, a first burst of repetitions of a system synchronization block (SSB), the first burst being transmitted in a first signal beam;

transmitting a system information block (SIB) that identifies a paging cycle for a given signal beam;

transmitting, during a user equipment (UE) device wake-up period associated with the paging cycle, a paging signal in the given signal beam;

transmitting, in the given signal beam, the SSB appended to the paging signal based on a duration between the UE device wake-up period and a previous transmission of the SSB in the given signal beam exceeding a threshold duration; and transmitting the paging signal without the SSB appended to the paging signal based on the duration being less than the threshold duration.

20. The method of claim 19, further comprising:

periodically transmitting, with a second transmission period, a second burst of repetitions of the SSB, the second burst being transmitted in a second signal beam oriented at a different angle than the first signal beam.

* * * * *